US008253997B2

(12) United States Patent
Nishida et al.

(10) Patent No.: US 8,253,997 B2
(45) Date of Patent: Aug. 28, 2012

(54) CORRECTION INFORMATION CREATION DEVICE, IMAGE FORMATION DEVICE, CORRECTION INFORMATION CREATION PROGRAM STORAGE MEDIUM AND CORRECTION INFORMATION CREATION METHOD

(75) Inventors: Toru Nishida, Kanagawa (JP); Susumu Kibayashi, Kanagawa (JP); Hiroaki Satoh, Kanagawa (JP); Takeshi Zengo, Kanagawa (JP); Tatsumi Komura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 937 days.

(21) Appl. No.: 12/327,130

(22) Filed: Dec. 3, 2008

(65) Prior Publication Data

US 2009/0290184 A1 Nov. 26, 2009

(30) Foreign Application Priority Data

May 21, 2008 (JP) ................................ 2008-133076

(51) Int. Cl.

| | |
|---|---|
| ***H04N 1/46*** | (2006.01) |
| ***H04N 1/034*** | (2006.01) |
| ***B41J 2/01*** | (2006.01) |
| ***B41J 3/00*** | (2006.01) |
| ***B41J 29/38*** | (2006.01) |
| ***B41J 29/393*** | (2006.01) |
| ***B41J 2/015*** | (2006.01) |
| ***B41J 2/14*** | (2006.01) |
| ***B41J 2/16*** | (2006.01) |
| ***B41J 2/12*** | (2006.01) |

(52) U.S. Cl. ................ 358/504; 358/502; 347/1; 347/2; 347/3; 347/4; 347/5; 347/6; 347/9; 347/19; 347/20; 347/47; 347/78

(58) Field of Classification Search ........................ None
See application file for complete search history.

(56) References Cited

U.S. PATENT DOCUMENTS

2008/0030536 A1 2/2008 Furukawa et al.
2008/0100655 A1 5/2008 Furuya et al.

FOREIGN PATENT DOCUMENTS

| | | |
|---|---|---|
| JP | 3-2068 | 1/1991 |
| JP | 3129810 | 8/1993 |
| JP | 2003-211770 | 7/2003 |
| JP | 2007-301768 | 11/2007 |
| JP | 2008-036968 | 2/2008 |
| JP | 2008-110572 | 5/2008 |

OTHER PUBLICATIONS

JP-2007301768—translation.*
JP2008203472—abstract.*

* cited by examiner

*Primary Examiner* — Fan Zhang
(74) *Attorney, Agent, or Firm* — Fildes & Outland, P.C.

(57) ABSTRACT

A correction information creation device including: a recording head; a rotating body; a first detector that detects a period of a pulse signal generated in accordance with rotation of the rotating body; a first calculation section that calculates a period of a clock signal; a second detector that detects a space between corrective images that are formed synchronously with a period of the clock signal, while the rotating body is being rotated at a predetermined rotation speed, by two sets of image formation elements of the recording head; a second calculation section that calculates a distance between a measurement position of a peripheral surface of the rotating body and the axial center of the rotating body; and a memory that stores the calculated distance to serve as information for correcting the period of the clock signal.

15 Claims, 13 Drawing Sheets

48a
48
(332)
L
CORRECTIVE IMAGES
RECORDING PAPER P
CONVEYANCE DIRECTION (SUB-SCANNING DIRECTION)

CORRECTION INFORMATION CREATION DEVICE, IMAGE FORMATION DEVICE, CORRECTION INFORMATION CREATION PROGRAM STORAGE MEDIUM AND CORRECTION INFORMATION CREATION METHOD

CROSS-REFERENCE TO RELATED APPLICATION

This application is based on and claims priority under 35 USC 119 from Japanese Patent Application No. 2008-133076 filed on May 21, 2008.

BACKGROUND

1. Technical Field

The present invention relates to a correction information creation device, an image formation device, a correction information creation program storage medium and a correction information creation method.

2. Related Art

Heretofore, technologies have been proposed for accurately correcting timings at which image formation is performed in an image formation device.

SUMMARY

One aspect of the present invention is a correction information creation device including: a recording head in which plural image formation elements are two-dimensionally arranged such that the image formation elements are not aligned in a sub-scanning direction, the image formation elements respectively forming dots that constitute an image at a predetermined surface synchronously with a clock signal;

- a rotating body that rotates with a peripheral surface thereof opposing the image formation elements, the rotating body functioning as one of
  - a transfer body that transfers an image formed at the peripheral surface by the image formation elements to a surface of a recording medium or
  - a conveyance body that conveys the recording medium, in a state in which the recording medium is retained at the peripheral surface, such that the surface of the recording medium opposes the image formation elements;
- a pulse generator that generates a pulse signal in accordance with rotation of the rotating body;
- a first detector that detects a period of the pulse signal;
- a first calculation section that calculates a period of the clock signal on the basis of a reference rotation angle of the rotating body at which the pulse signal is generated, a distance between neighboring dots, an ideal distance between the peripheral surface of the rotating body and an axial center of the rotating body, and the detected period of the pulse signal;
- a formation section that, while the rotating body is being rotated at a predetermined rotation speed, causes at least two sets of image formation elements of the plural image formation elements to sequentially form corrective images, which are used for correcting the period of the clock signal, at different positions of the peripheral surface, synchronously with a clock signal occurring at the period calculated by the first calculation section, wherein the at least two sets of image formation elements comprises a first set of image formation elements disposed at upstream side in a rotation direction of the rotating body, and a second set of image formation elements disposed at downstream side in the rotation direction, the at least two sets of image formation elements are separated from each other by a predetermined space in the rotation direction,
- a second detector that detects a space between the formed corrective images;
- a second calculation section that calculates a distance between a measurement position of the peripheral surface of the rotating body and the axial center of the rotating body on the basis of the detected space between the corrective images, a value obtained by multiplying the distance between the dots by a predetermined integer, the predetermined space, and the ideal distance between the peripheral surface of the rotating body and the axial center of the rotating body; and
- a memory section that stores distance information representing the distance calculated by the second calculation section, to serve as information for correcting the period of the clock signal, in association with a measurement rotation angle from a reference position of the rotating body to the measurement position.

BRIEF DESCRIPTION OF THE DRAWINGS

Exemplary embodiments of the present invention will be described in detail based on the following figures, wherein.

DETAILED DESCRIPTION

Herebelow, exemplary embodiments of the present invention will be described in detail with reference to the drawings.

First Exemplary Embodiment

Figure 1:
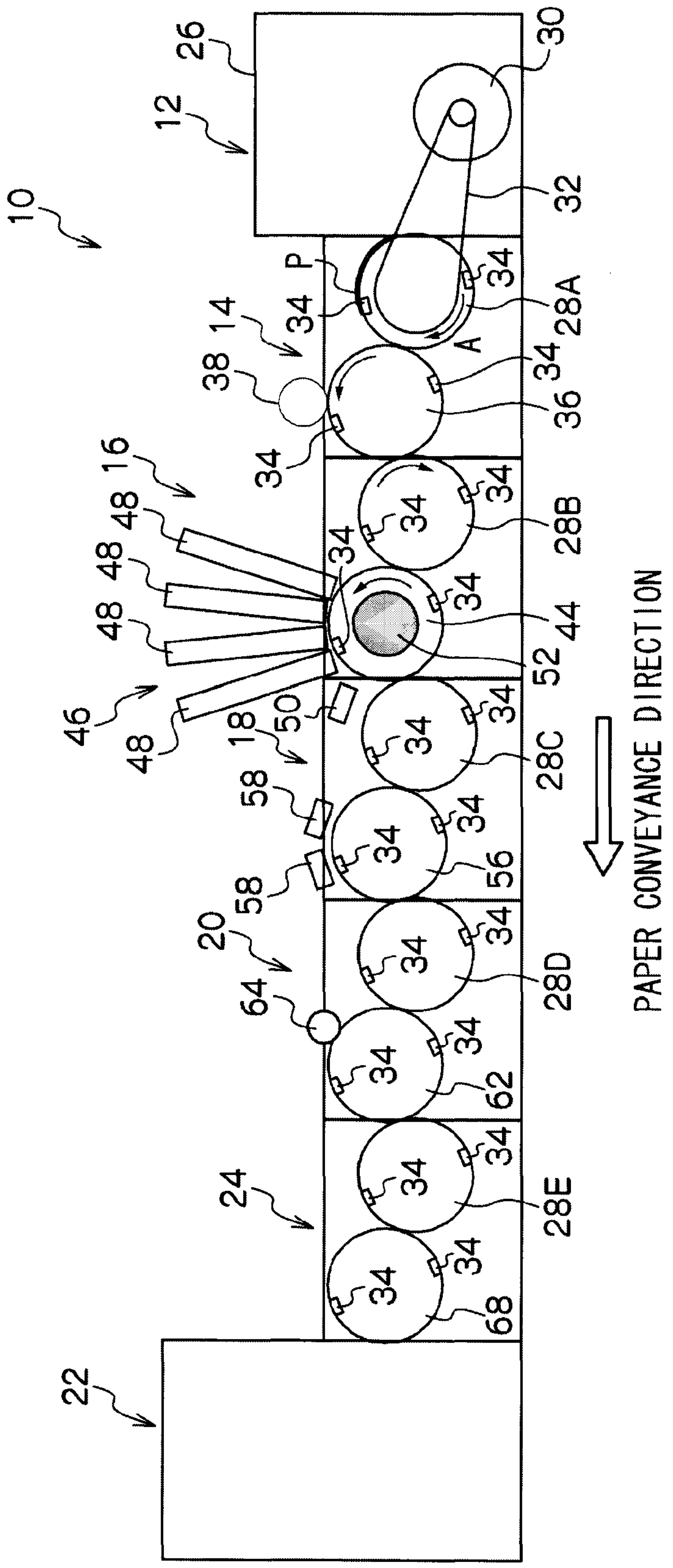
FIG. 1 is a side view showing structure of an image formation device relating to a first exemplary embodiment.

FIG. 1 is a side view showing structure of an image formation device 10 relating to the first exemplary embodiment.

As shown in FIG. 1, the image formation device 10 is provided with a paper supply conveyance section 12 that supplies and conveys recording paper P, which is a recording medium. A processing liquid application section 14, an image formation section 16, an ink drying section 18, an image fixing section 20 and an paper ejection conveyance section 24 are provided along a conveyance direction of the recording paper P at a downstream side of the paper supply conveyance section 12. The processing liquid application section 14 applies processing liquid to a recording face (surface) of the recording paper P. The image formation section 16 forms an image on the recording face of the recording paper P. The ink drying section 18 dries the image formed on the recording face. The image fixing section 20 fixes the dried image to the recording paper P. The paper ejection conveyance section 24 conveys the recording paper P to which the image has been fixed to an ejection section 22.

The paper supply conveyance section 12 is provided with an accommodation section 26 that accommodates the recording paper P. A motor 30 is provided at the accommodation section 26. A paper supply apparatus (not shown) is also provided at the accommodation section 26. The recording paper P is fed out by the paper supply apparatus from the accommodation section 26 toward the processing liquid application section 14.

The processing liquid application section 14 is provided with an intermediate conveyance drum 28A and a processing liquid application drum 36. The intermediate conveyance drum 28A is rotatably disposed between the accommodation section 26 and the processing liquid application drum 36. A belt 32 spans between a rotation axle of the intermediate conveyance drum 28A and a rotation axle of the motor 30. Accordingly, rotary driving force of the motor 30 is transmitted to the intermediate conveyance drum 28A via the belt 32, and the intermediate conveyance drum 28A rotates in the direction of arrow A.

A retention member 34 is provided at the intermediate conveyance drum 28A. The retention member 34 nips a distal end of the recording paper P and retains the recording paper P onto the intermediate conveyance drum 28A. The recording paper P fed out from the accommodation section 26 to the processing liquid application section 14 is retained at a peripheral surface of the intermediate conveyance drum 28A by the retention member 34, and is conveyed to the processing liquid application drum 36 by rotation of the intermediate conveyance drum 28A.

Similarly to the intermediate conveyance drum 28A, retention members 34 are provided at intermediate conveyance drums 28B to 28E, the processing liquid application drum 36, an image formation drum 44, an ink drying drum 56, an image fixing drum 62 and an ejection conveyance drum 68, which are described below. The recording paper P is passed along from upstream side drums to downstream side drums by these retention members 34.

The processing liquid application drum 36 is linked with the intermediate conveyance drum 28A by unillustrated gears, and rotates due to the rotary force received through the gears.

The recording paper P that has been conveyed by the intermediate conveyance drum 28A is taken up onto the processing liquid application drum 36 by the retention member 34 of the processing liquid application drum 36, and is conveyed in a state of being retained at a peripheral surface of the processing liquid application drum 36.

At an upper portion of the processing liquid application drum 36, a processing liquid application roller 38 is disposed in a state of contacting against the peripheral surface of the processing liquid application drum 36. Processing liquid is applied to the recording face of the recording paper P on the peripheral surface of the processing liquid application drum 36 by the processing liquid application drum 38. This processing liquid will react with the ink and coagulate a colorant (pigment), and promote separation of the colorant from a solvent.

The recording paper P to which the processing liquid has been applied by the processing liquid application section 14 is conveyed to the image formation section 16 by rotation of the processing liquid application drum 36.

The image formation section 16 is provided with the intermediate conveyance drum 28B and the image formation drum 44. The intermediate conveyance drum 28B is linked with the intermediate conveyance drum 28A by unillustrated gears, and rotates due to the rotary force received through the gears.

The recording paper P conveyed by the processing liquid application drum 36 is taken up onto the intermediate conveyance drum 28B of the image formation section 16 by the retention member 34 thereof, and is conveyed in a state of being retained at a peripheral surface of the intermediate conveyance drum 28B.

The image formation drum 44 is linked with the intermediate conveyance drum 28A by unillustrated gears, and rotates due to the rotary force received through the gears.

The recording paper P conveyed by the intermediate conveyance drum 28B is taken up onto the image formation drum 44 by the retention member 34 thereof, and is conveyed in a state of being retained at a peripheral surface of the image formation drum 44.

Above the image formation drum 44, a head unit 46 is disposed close to the peripheral surface of the image formation drum 44. The head unit 46 is provided with four inkjet recording heads 48, corresponding to each of the four colors yellow (Y), magenta (M), cyan (C) and black (K). These inkjet recording heads 48 are arranged along the peripheral direction of the image formation drum 44, and form an image by ejecting ink droplets from nozzles 48*a*, synchronously with clock signals from a CPU 70, such that the ink droplets are superposed with a layer of the processing liquid that has been formed on the recording face of the recording paper P by the processing liquid application section 14. Details of processings performed by the nozzles 48*a* and the CPU 70 will be described later.

At a downstream side of the head unit 46, a camera 50, constituted with a charge coupled device (CCD), is disposed to be capable of photographing the image formed at the recording paper P by the head unit 46. The camera 50 relating to the first exemplary embodiment is capable of capturing a full-color image. For the camera 50 relating to the first exemplary embodiment, a camera is employed with which the resolution of a photographed image is about four times a resolution of image formation by the inkjet recording head 48 (i.e., about two times a nozzle resolution). Although in the first exemplary embodiment, a CCD camera is employed as the camera 50, the embodiment is not limited thereto and other solid state imaging device such as a CMOS image sensor or the like may be employed.

The image formation drum 44 is provided with a rotary encoder 52. The rotary encoder 52 relating to the first exemplary embodiment generates, in association with rotation of the image formation drum 44, a pulse signal for detecting a pre-specified reference position of the image formation drum 44 and a pulse signal for detecting rotation angles of the image formation drum 44 from the reference position.

The recording paper P on which the image has been formed on the recording face by the image formation section 16 is conveyed to the ink drying section 18 by rotation of the image formation drum 44.

The ink drying section 18 is provided with the intermediate conveyance drum 28C and the ink drying drum 56. The intermediate conveyance drum 28C is linked with the intermediate conveyance drum 28A by unillustrated gears, and rotates due to the rotary force received through the gears.

The recording paper P conveyed by the image formation drum 44 is taken up onto the intermediate conveyance drum 28C by the retention member 34 thereof, and is conveyed in a state of being retained at a peripheral surface of the intermediate conveyance drum 28C.

The ink drying drum 56 is linked with the intermediate conveyance drum 28A by unillustrated gears, and rotates due to the rotary force received through the gears.

The recording paper P that has been conveyed by the intermediate conveyance drum 28C is taken up onto the ink drying drum 56 by the retention member 34 thereof, and is conveyed in a state of being retained at a peripheral surface of the ink drying drum 56.

Above the ink drying drum 56, a hot air heater 58 is disposed close to the peripheral surface of the ink drying drum 56. Excess solvent in the image formed on the recording paper P is removed by hot air from the hot air heater 58. The recording paper P at which the image on the recording face has been dried by the ink drying section 18 is conveyed to the image fixing section 20 by rotation of the ink drying drum 56.

The image fixing section 20 is provided with the intermediate conveyance drum 28D and the image fixing drum 62. The intermediate conveyance drum 28D is linked with the intermediate conveyance drum 28A by unillustrated gears, and rotates due to the rotary force received through.

The recording paper P conveyed by the ink drying drum 56 is taken up onto the intermediate conveyance drum 28D by the retention member 34 thereof, and is conveyed in a state of being retained at a peripheral surface of the intermediate conveyance drum 28D.

The image fixing drum 62 is linked with the intermediate conveyance drum 28A by unillustrated gears, and rotates due to the rotary force received through the gears.

The recording paper P conveyed by the intermediate conveyance drum 28D is taken up onto the image fixing drum 62 by the retention member 34 thereof, and is conveyed in a state of being retained at a peripheral surface of the image fixing drum 62.

At an upper portion of the image fixing drum 62, a fixing roller 64, which has a heater thereinside, is disposed in a state of press contacting against a peripheral surface of the image fixing drum 62. The recording paper P retained on the peripheral surface of the image fixing drum 62 is heated by the heater while the recording paper P is press contacting with the fixing roller 64, and thus colorant in the image formed at the recording face of the recording paper P is fused to the recording paper P, and the image is fixed to the recording paper P. The recording paper P to which the image has been fixed by the image fixing section 20 is conveyed to the paper ejection conveyance section 24 by rotation of the image fixing drum 62.

The paper ejection conveyance section 24 is provided with the intermediate conveyance drum 28E and the ejection conveyance drum 68. The intermediate conveyance drum 28E is linked with the intermediate conveyance drum 28A by unillustrated gears, and rotates due to the rotary force received through the gears.

The recording paper P conveyed by the image fixing drum 62 is taken up onto the intermediate conveyance drum 28E by the retention member 34 thereof, and is conveyed in a state of being retained at a peripheral surface of the intermediate conveyance drum 28E.

The ejection conveyance drum 68 is linked with the intermediate conveyance drum 28A by unillustrated gears, and rotates due to the rotary force received through the gears.

The recording paper P that has been conveyed by the intermediate conveyance drum 28E is taken up onto the ejection conveyance drum 68 by the retention member 34 thereof, and is conveyed toward the ejection section 22 in a state of being retained at a peripheral surface of the ejection conveyance drum 68.

Figure 2:
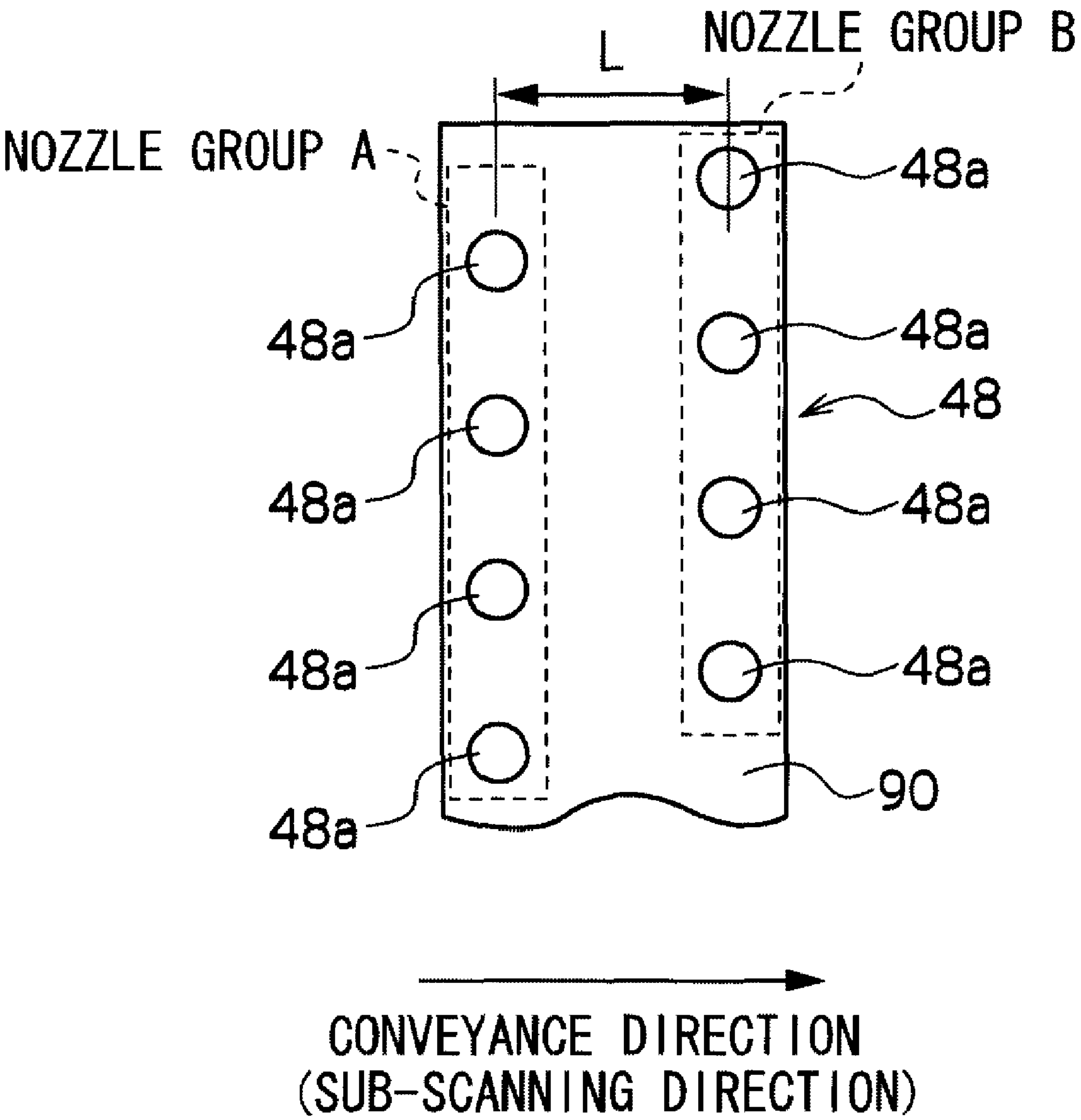
FIG. 2 is a front view showing structure of an ink ejection nozzle face of an inkjet recording head relating to the first exemplary embodiment.

FIG. 2 is a front view showing structure of an ink ejection nozzle face of the inkjet recording head 48 relating to the first exemplary embodiment.

As shown in FIG. 2, plural nozzles 48*a*, which respectively eject ink droplets, are formed in a face 90 of the inkjet recording head 48 that opposes the peripheral surface of the image formation drum 44. The inkjet recording head 48 has a configuration in which the plural nozzles 48*a* are arranged in a two-dimensional pattern such that the nozzles 48*a* are not aligned (do not form a straight line) in the direction in which the image formation drum 44 conveys the recording paper P (a sub-scanning direction). That is, the plural nozzles 48*a* are arranged in a staggered matrix. As a result, nozzles (projected nozzle pitches) can in practice be spaced more densely in a length direction of the head (a direction orthogonal to the direction in which the image formation drum 44 conveys the recording paper P (herebelow referred to as the conveyance direction)).

Here, in the inkjet recording head 48 relating to the first exemplary embodiment, the plural nozzles 48*a* are arranged in two rows with respect to the sub-scanning direction and the two rows are separated by L mm in the sub-scanning direction (conveyance direction). Hereafter, the plural nozzles 48*a* in the row at the conveyance direction upstream side are referred to as nozzle group A, and the plural nozzles 48*a* in the row at the conveyance direction downstream side are referred to as nozzle group B.

Figure 3:
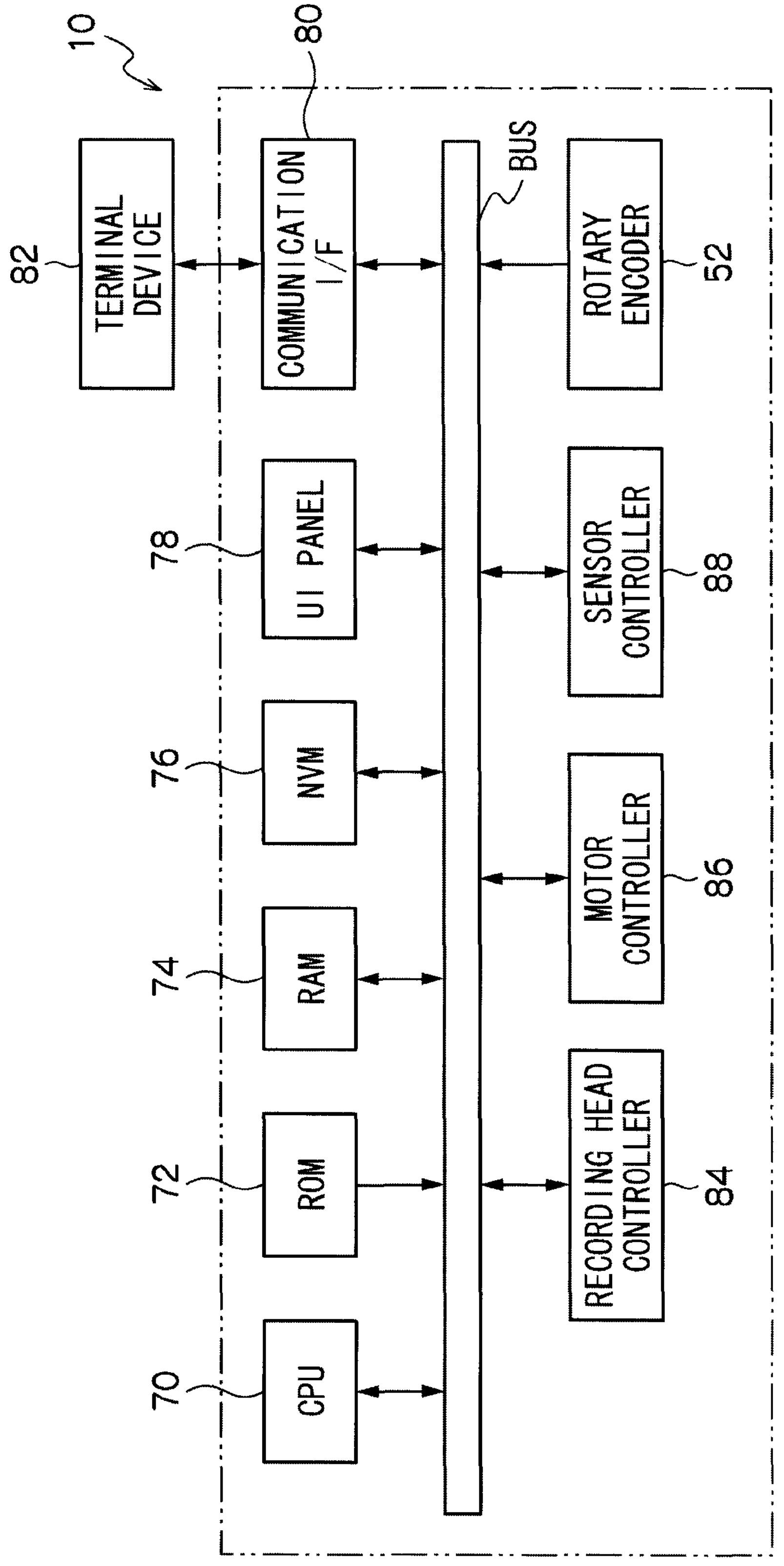
FIG. 3 is a block diagram showing principal structures of an electronic system of the image formation device relating to the first exemplary embodiment.

FIG. 3 is a block diagram showing principal structures of an electronic system of the image formation device 10 relating to the first exemplary embodiment.

As shown in FIG. 3, the image formation device 10 is structured to include the central processing unit (CPU) 70, a read-only memory (ROM) 72, a random access memory (RAM) 74, an non-volatile memory (NVM) 76, a user interface (UI) panel 78 and a communication interface 80.

The CPU 70 controls overall operations of the image formation device 10. The ROM 72 functions as a memory section that stores: a control program that controls operations of the image formation device 10; a rotation angle of the image formation drum 44 at which the pulse signal is generated by the rotary encoder 52, that is, a rotation angle of the image formation drum 44 when a pulse signal for detecting a rotation angle of the image formation drum 44 with respect to the reference position is generated (referred to hereafter as reference rotation angle $\Theta_0$); an ideal distance between the peripheral surface of the image formation drum 44 and the axial (rotational) center of the image formation drum 44 (referred to hereafter as distance $R_0$); a distance between neighboring dots (herein, between centers of the dots; referred to hereafter as distance $X_0$); a correction table creation program described below; and various parameters and the like. In the first exemplary embodiment, an ideal radius of the image formation drum 44 is (i.e., a designed radius of the formation drum 44) used as the distance $R_0$ but this is not limiting, and a different value may be used.

The RAM 74 is used as a work area during execution of various programs and the like. The NVM 76 stores various kinds of information that need to be retained even when a power switch of the device is turned off.

The UI panel 78 is structured by a touch panel display, in which a transparent touch panel is superposed on a display, or the like, displays various kinds of information at a display screen of the display, and inputs required information, instructions and the like in accordance with a user touching the touch panel.

The communication interface 80 is connected with a terminal device 82, such as a personal computer or the like, and receives image information representing an image to be formed at the recording paper P and various other kinds of information from the terminal device 82.

The CPU 70, the ROM 72, the RAM 74, the NVM 76, the UI panel 78 and the communication interface 80 are connected to one another via a system bus (BUS). Therefore, the CPU 70 may perform each of access to the ROM 72, the RAM 74 and the NVM 76, display of various kinds of information at the UI panel 78, acquisition of details of control instructions from users from the UI panel 78, and reception of various kinds of information from the terminal device 82 via the communication interface 80.

The image formation device 10 further includes a recording head controller 84, a motor controller 86 and a sensor controller 88.

The recording head controller 84 controls operations of the inkjet recording head 48 in accordance with instructions from the CPU 70. The motor controller 86 controls operations of the motor 30. The sensor controller 88 controls operations of the camera 50.

The recording head controller 84, the motor controller 86 and the sensor controller 88 are also connected to the above-mentioned system bus. Therefore, the CPU 70 may implement control of operations of the recording head controller 84, the motor controller 86 and the sensor controller 88.

The aforementioned rotary encoder 52 is also connected to the system bus. Therefore, the CPU 70 may receive the pulse signals generated by the rotary encoder 52.

Next, operation of the image formation device 10 relating to the first exemplary embodiment will be described.

In the image formation device 10 relating to the first exemplary embodiment, recording paper P is fed out from the accommodation section 26 to the intermediate conveyance drum 28A by the paper supply apparatus, the recording paper P is conveyed via the intermediate conveyance drum 28A, the processing liquid application drum 36 and the intermediate conveyance drum 28B to the image formation drum 44, and is retained at the peripheral surface of the image formation drum 44. Then, ink droplets are ejected at the recording paper P on the image formation drum 44 from the nozzles 48*a* of the inkjet recording head 48 in accordance with image data (information). Thus, an image represented by the image data is formed on the recording paper P.

Figure 4:
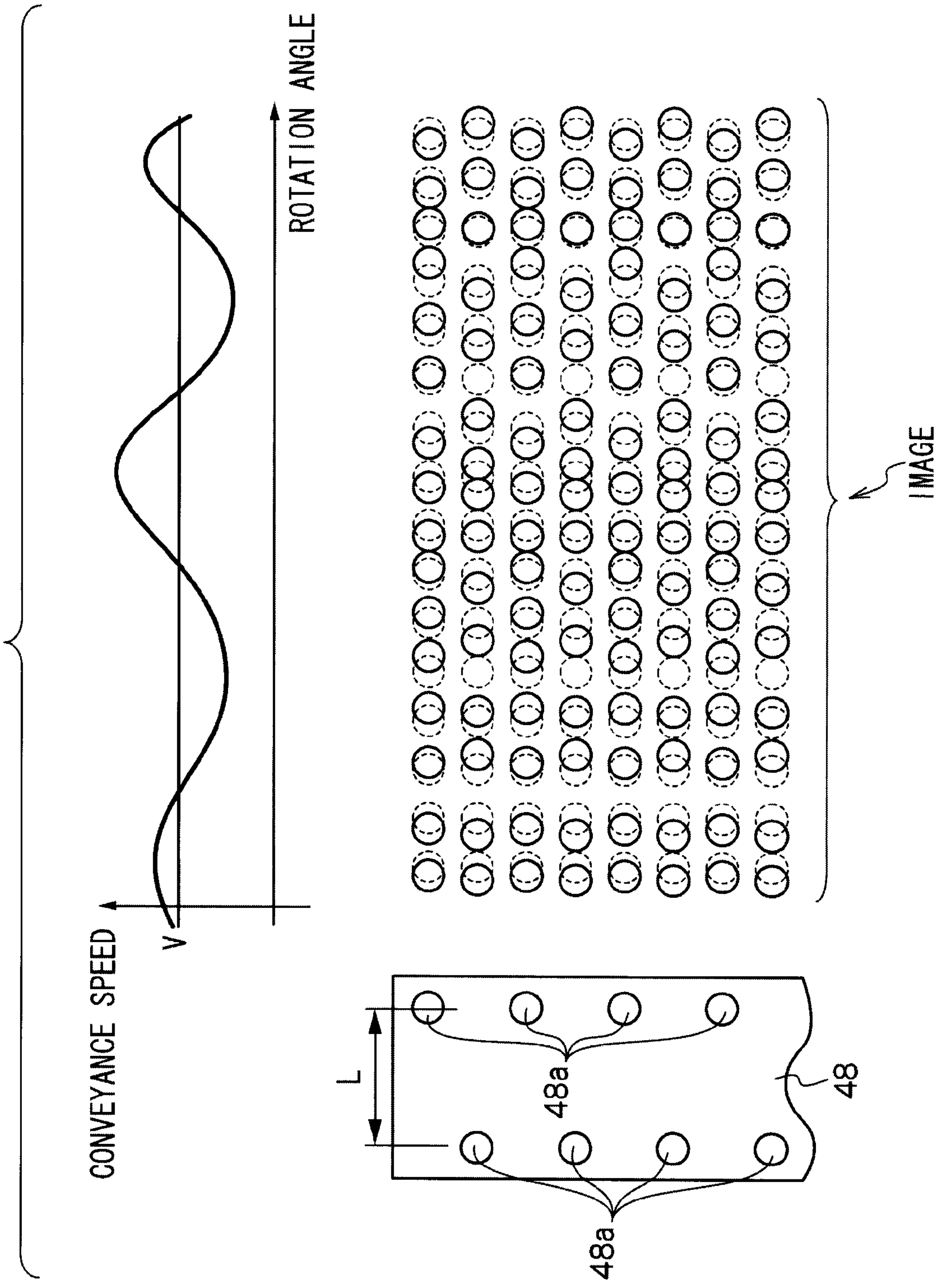
FIG. 4 is schematic views illustrating an example of variations in conveyance velocity associated with increasing rotation angle of an image formation drum of the image formation device relating to the first exemplary embodiment, and an example of alterations of impact (marking) positions of ink droplets due to the variations.

Now, a conveyance speed of the recording paper P retained at the peripheral surface of the image formation drum 44 varies as is shown by the example in the graph of FIG. 4, for reasons such as eccentricity of the image formation drum 44, errors from installation of the rotary encoder 52, and the like. The vertical axis of the graph in FIG. 4 shows the conveyance speed of the recording paper P at the image formation drum 44, and the horizontal axis shows the rotation angle of the image formation drum 44 from the reference position. The broken line circles in the image in FIG. 4 show an example of impact (marking) positions of ink droplets ejected from the respective nozzles 48*a* in a case in which there is no eccentricity of the image formation drum 44 or installation errors of the rotary encoder 52 (i.e., a case in which the conveyance speed of the recording paper P is constant at a speed V). The solid line circles in the image in FIG. 4 show an example of impact positions of the ink droplets ejected from the nozzles 48*a* in a case in which there is eccentricity of the image formation drum 44 and/or an installation error of the rotary encoder 52.

In conditions in which the conveyance speed of the recording paper P at the image formation drum 44 varies in this manner, clock signals synchronized with the pulse signals generated by the rotary encoder 52 are outputted to the inkjet recording heads 48, and the ink droplets are ejected from the nozzles 48*a* in the inkjet recording heads 48 synchronously with these clock signals, an image formed by the ink droplets will deform as shown in the example in FIG. 4.

Accordingly, in the image formation device 10 relating to the first exemplary embodiment, in order to suppress deformation of an image caused by eccentricity of the image formation drum 44, an installation error of the rotary encoder 52 and suchlike, correction table creation processing is executed.

Figure 5:
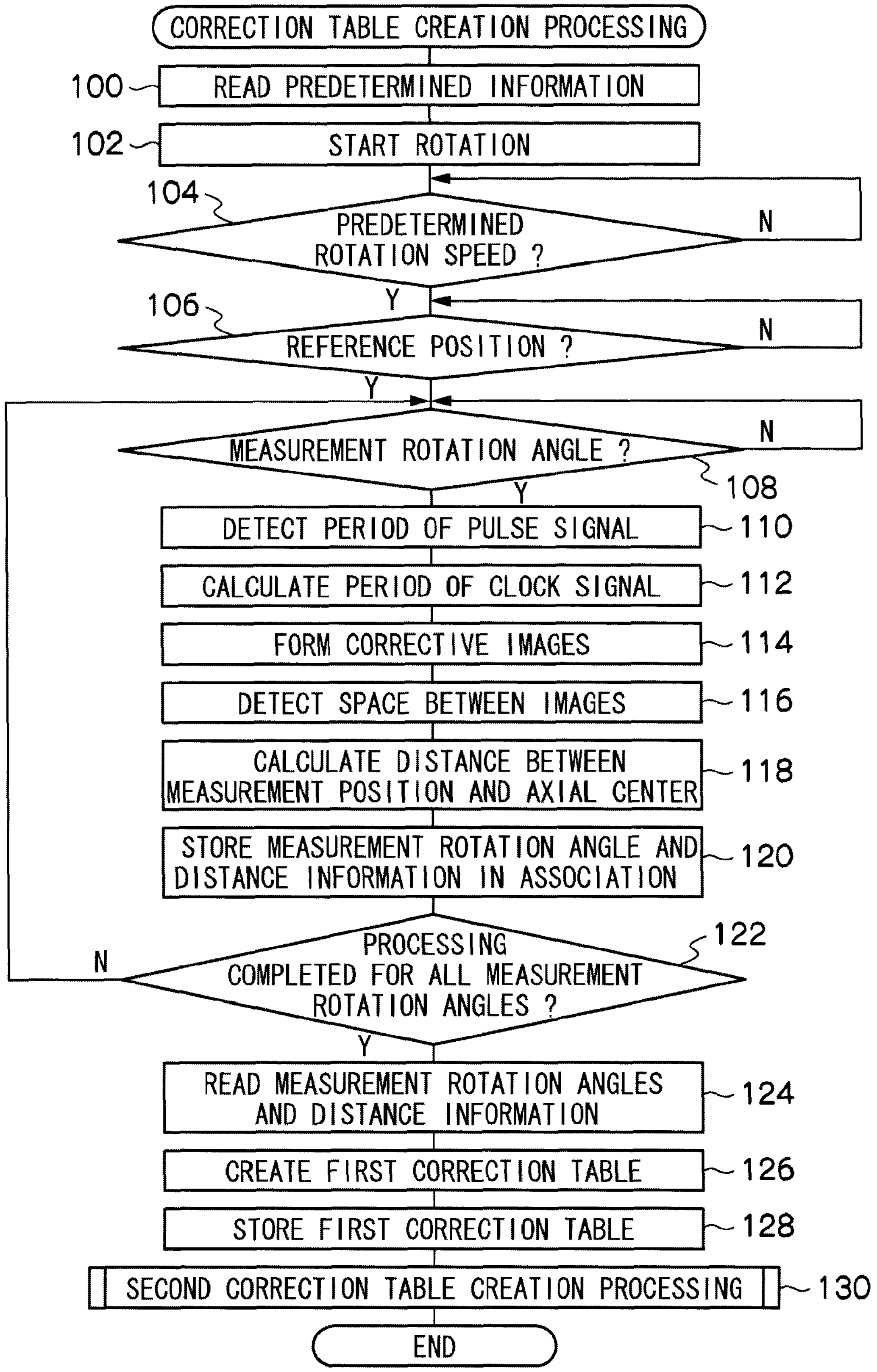
FIG. 5 is a flowchart showing a flow of a correction table creation program relating to the first exemplary embodiment.

Next, operation of the image formation device 10 when the correction table creation processing is being executed will be described with reference to FIG. 5. FIG. 5 is a flowchart showing a flow of a correction table creation program executed by the CPU 70 of the image formation device 10 when an instruction for execution of the correction table creation processing is inputted via the UI panel 78. The program is stored in a predetermined region of the ROM 72.

In step 100 of FIG. 5, the reference rotation angle $\Theta_0$ and the distances $X_0$ and $R_0$ are read out from the ROM 72. In step 102, the motor 30 is controlled such that the image formation drum 44 starts rotary driving. In step 104, the processing waits until the image formation drum 44 reaches a predetermined rotation speed (for example, 10 mm/s).

In step 106, the processing waits until the image formation drum 44 reaches the reference position. Then, in step 108, the processing waits until a rotation angle of the image formation drum 44 from the reference position reaches a pre-specified (measurement) rotation angle. Here, there are multiple pre-specified (measurement) rotation angles, which are processed sequentially.

In step 110, a period of the pulse signal inputted from the rotary encoder 52 is detected. In step 112, a period of the clock signal that determines timings of ejection of ink droplets from the nozzles 48*a* is calculated with the following equation (1), and the processing advances to step 114. In equation (1), P represents the period of the clock signal and E represents the period of the pulse signal detected in step 110.

$$P = \frac{X_0}{\Theta_0 R_0} E \qquad (1)$$

Figure 6:
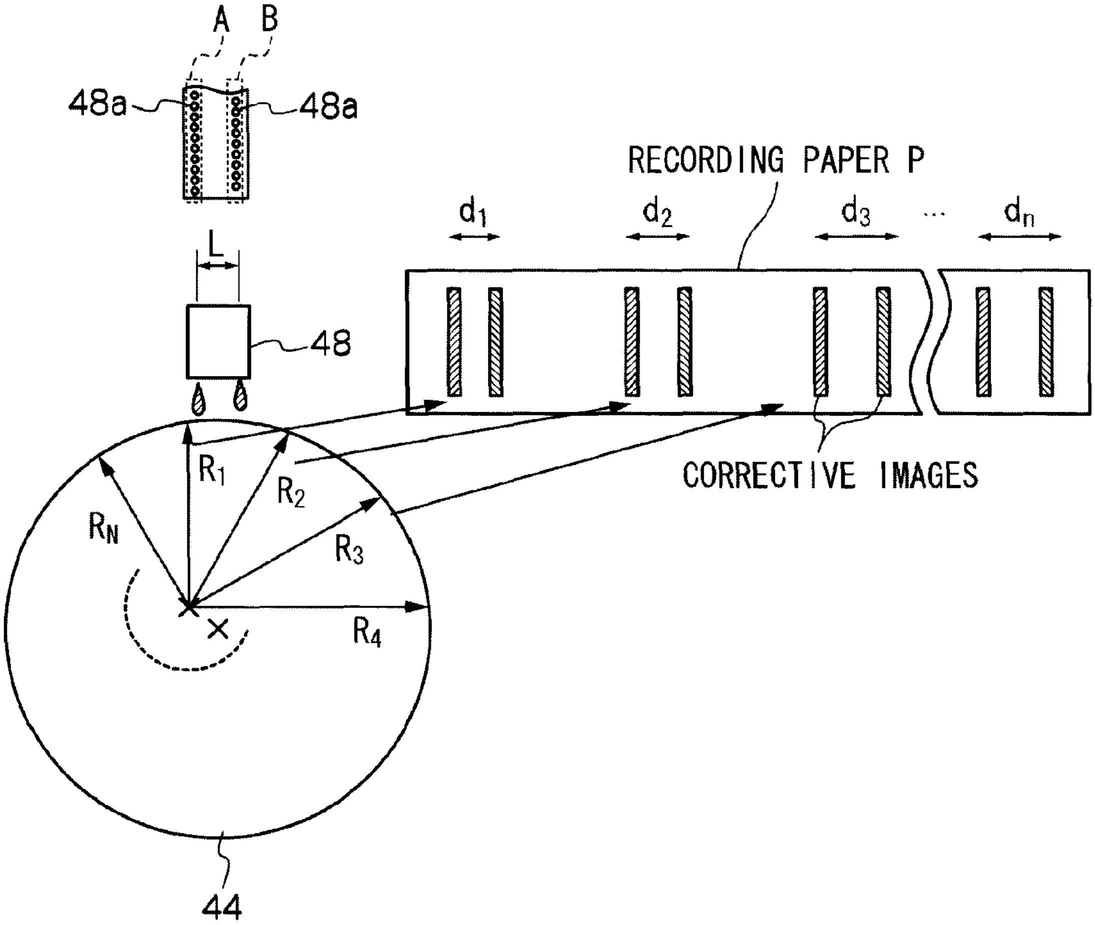
FIG. 6 is a schematic view for explaining a process of forming corrective images with the image formation device relating to the first exemplary embodiment.

In step 114, as shown by the example in FIG. 6, corrective images are formed sequentially by nozzle group A and nozzle group B at different positions on the recording face (a predetermined face) of the recording paper P, synchronously with the clock signal with the period calculated in step 112, and the processing advances to step 116. The corrective images are used for correcting periods of clock signals supplied from the CPU 70 for ejection of ink droplets from the nozzles 48*a*.

In the image formation device 10 relating to the first exemplary embodiment, line images as shown in FIG. 6 are employed as the corrective images.

In the image formation device 10 relating to the first exemplary embodiment, as the processing of step 114, the nozzle group A and nozzle group B are controlled to sequentially form the corrective images on the recording face of the recording paper P synchronously with the clock signal with the period calculated in step 112, such that a distance (space) between the corrective images to be an integer multiple of the distance $X_0$, the integer being at least 1 (3 in this case).

In step 116, a space between the corrective images actually formed on the recording face of the recording paper P is detected by the camera 50, and the processing advances to step 118.

In step 118, a distance between a predetermined (measurement) position of the peripheral surface of the image formation drum 44 (here, a center point between the corrective images) and the axial center of the image formation drum 44 (i.e., actual radius of the image formation drum 44 at each measurement position) is calculated with the following equation (2), and the processing advances to step 120. In the first exemplary embodiment, in equation (2), R represents the distance between the predetermined (measurement) position of the peripheral surface of the image formation drum 44 and the axial center of the image formation drum 44, d represents the space between the corrective images detected in step 116, L represents the space between the nozzle groups A and B, and n represents the integer that is at least 1 (3 in this case).

$$R = \frac{L - d}{L - nX_0} R_0 \tag{2}$$

In step 120, the pre-specified (measurement) rotation angle and distance information representing the distance calculated in the above-described step 118 are stored in association in the NVM 76. In step 122, it is determined whether the processing of steps 110 to 120 has been completed for all of the pre-specified (measurement) rotation angles. If this determination is negative, the processing returns to step 108, and if positive, the processing advances to step 124.

In step 124, the rotation angles and distance information that have been stored in the NVM 76 in step 120 are read out from the NVM 76. In step 126, a first correction table is created, associating each rotation angle with the corresponding distance information as information for correcting the period of the clock signal. In step 128, the first correction table is stored in the NVM 76, and the processing advances to step 130.

In step 130, a second correction table creation processing routine program, which will be described below, is executed, and then the correction table creation program ends.

Figure 7:
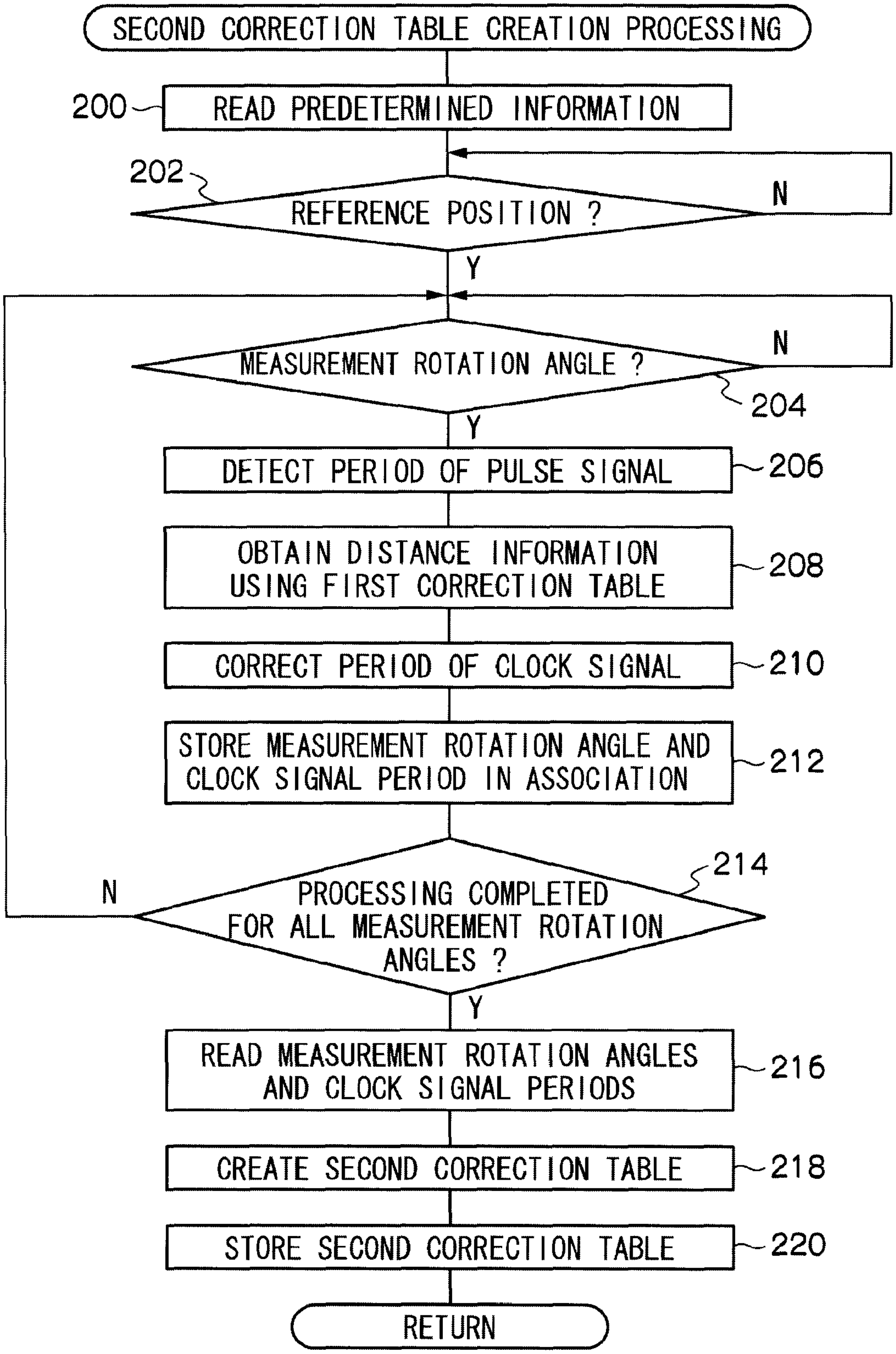
FIG. 7 is a flowchart showing a flow of a second correction table creation routine program relating to the first exemplary embodiment.

Next, the second correction table creation routine program relating to the first exemplary embodiment will be described with reference to FIG. 7. FIG. 7 is a flowchart showing a flow of processing of the second correction table creation processing routine program. This program is also stored in a predetermined region of the ROM 72.

In step 200 of FIG. 7, the reference rotation angle $\Theta_0$ and the distance $X_0$ are read from the ROM 72. In step 202, the processing waits until the image formation drum 44 reaches the reference position. In step 204, the processing waits until a rotation angle of the image formation drum 44 from the reference position reaches a pre-specified (measurement) rotation angle in question.

In step 206, a period of the pulse signal inputted from the rotary encoder 52 is detected. In step 208, the first correction table stored in the NVM 76 is read out, distance information corresponding to the pre-specified (measurement) rotation angle is obtained with reference to the first correction table, and the processing advances to step 210.

In step 210, by calculating the period of the clock signal with the following equation (3), the period of the clock signal is corrected, and the processing advances to step 212. In equation (3), P represents the period of the clock signal, R represents the distance represented by the distance information obtained in step 208, and E represents the period of the pulse signal detected in step 206.

$$P = \frac{X_0}{\Theta_0 R} E \tag{3}$$

In step 212, the pre-specified (measurement) rotation angle and the period of the clock signal that has been corrected in step 210 are stored in association in the NVM 76. In step 214, it is determined whether or not the processing of step 206 to step 212 has been completed for all of the pre-specified (measurement) rotation angles. If this determination is negative, the processing returns to step 204, and if positive, the processing advances to step 216.

In step 216, the (measurement) rotation angles and clock signal periods stored in the NVM 76 in step 212 are read out from the NVM 76. In step 218, a second correction table is created, associating each (measurement) rotation angle read in step 216 with the corresponding clock signal period. In step 220, the second correction table is stored in the NVM 76, and the second correction table creation routine program ends.

Thus, in the image formation device 10 relating to the first exemplary embodiment, by the correction table creation processing being executed, two corrective images are formed for each pre-specified (measurement) rotation angle on the recording paper P on the image formation drum 44 in accordance with a clock signal, and spaces between the corrective images of the respective pre-specified (measurement) rotation angles are detected. As shown in the example in FIG. 6, when the spaces between the two corrective images formed for each pre-specified (measurement) rotation angle are $d_1$, $d_2$, $d_3$, . . . , $d_n$, these spaces are used to calculate distances $R_1$, $R_2$, $R_3$, $R_4$, . . . , $R_N$ between the predetermined (measurement) positions at the peripheral surface of the image formation drum 44 (here, a center point of the pair of corrective images) and the axial center of the image formation drum 44 (i.e., actual radii at respective pre-specified (measurement) rotation angles) with equation (2) for the respective pre-specified (measurement) rotation angles. Hence, the first correction table is created associating the distances $R_1$, $R_2$, $R_3$, $R_4$, . . . , $R_N$ with the respective pre-specified (measurement) rotation angles.

Then, periods of the clock signals for the respective pre-specified (measurement) rotation angles are calculated with equation (3), using the periods of the pulse signals from the rotary encoder 52 at the respective pre-specified (measurement) rotation angles, the distances $R_1$, $R_2$, $R_3$, $R_4$, . . . , $R_N$ corresponding to the pre-specified (measurement) rotation angles, which are obtained by reference to the first correction table, the reference rotation angle $\Theta_0$, and the distance $X_0$.

Hence, a second correction table is created associating the pre-specified respective rotation angles with the corresponding clock signal periods.

After the correction table creation processing has been executed, when the CPU 70 receives image data, the CPU 70 turns the image formation drum 44 at a predetermined rotation speed (a rotation speed determined to be a speed at which excellent images are formed on the recording paper P), and reads the second correction table from the NVM 76. Referring to the second correction table, the CPU 70 generates clock signals with periods corresponding to the pre-specified (measurement) respective rotation angles, and causes ink droplets to be ejected from the nozzles 48*a* in accordance with the image data synchronously with these clock signals. As a result, an image represented by the image data is formed at the recording face of the recording paper P without being affected by changes in conveyance speed of the recording paper P.

Second Exemplary Embodiment

Next, a second exemplary embodiment will be described. In the second exemplary embodiment, portions that are the same as in the first exemplary embodiment are assigned the same reference numerals and descriptions thereof are omitted.

Figure 8:
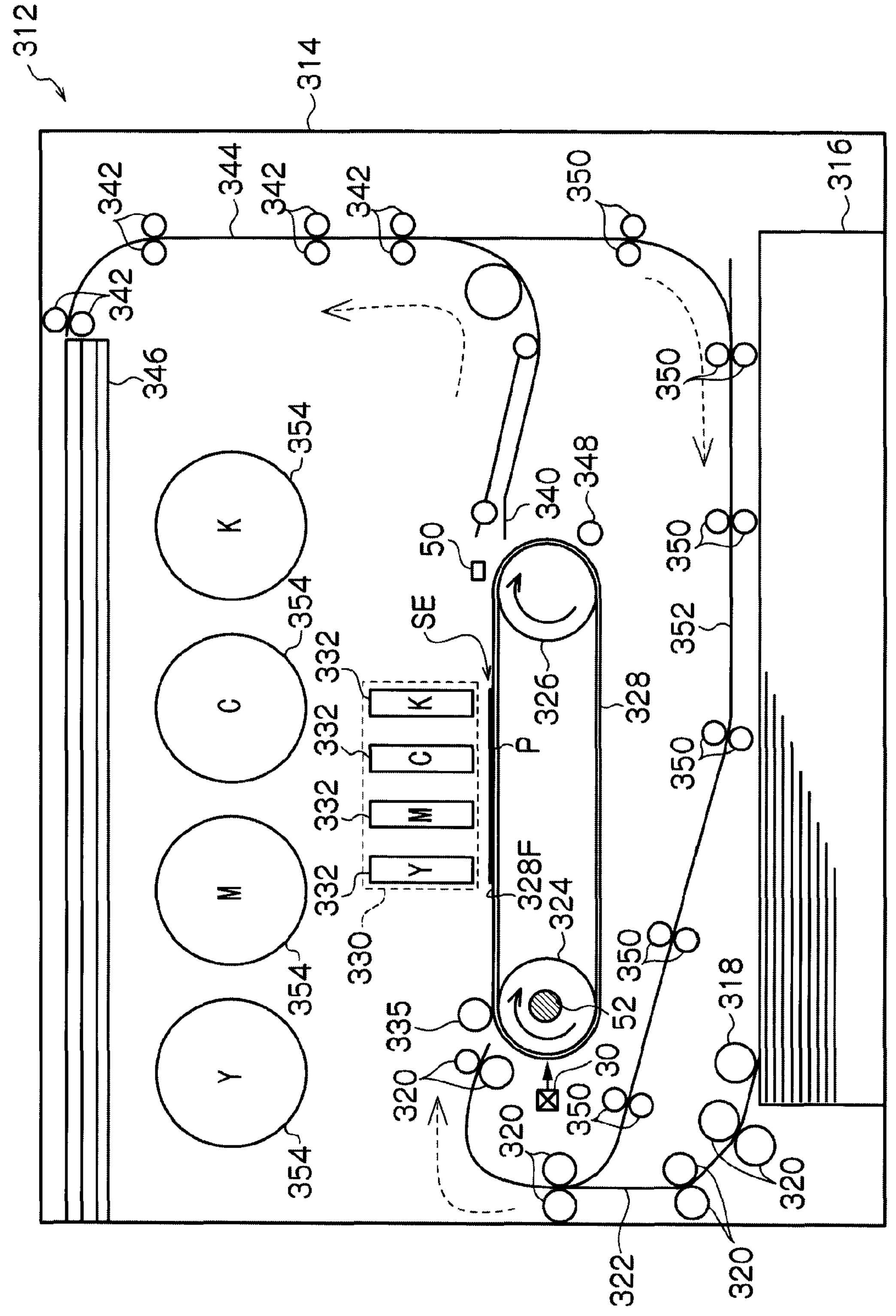
FIG. 8 is a side view showing structure of an image formation device relating to a second exemplary embodiment.

FIG. 8 is a side view showing structure of an image formation device 312 relating to the second exemplary embodiment;

As shown in FIG. 8, a paper supply tray 316 is provided at a lower portion of the interior of a casing 314 of the image formation device 312. Recording paper P stacked in the paper supply tray 316 may be taken out one sheet at a time by a pickup roller 318. The recording paper P that is taken out is conveyed by plural conveyance roller pairs 320, which structure a conveyance path 322. Hereafter, the term "conveyance direction" means a conveyance direction of the recording paper P, and the terms "upstream" and "downstream" mean upstream and downstream, respectively, with respect to the conveyance direction. Above the paper supply tray 316, an endless conveyance belt 328 is provided spanning between a driving roller 324 and a driven roller 326. The driving roller 324 rotates due to driving force received from the motor 30. The driving roller 324 is equipped with the rotary encoder 52. In accordance with rotation of the driving roller 324, the rotary encoder 52 relating to the second exemplary embodiment generates a pulse signal for detecting a pre-specified reference position of the driving roller 324 and a pulse signal for detecting rotation angles of the driving roller 324 from the reference position.

A recording head array 330 is disposed above the conveyance belt 328, opposing a flat portion 328F of the conveyance belt 328. This opposing region constitutes an ejection region SE, at which ink droplets are ejected from the recording head array 330. The recording paper P being conveyed along the conveyance path 322 is retained by the conveyance belt 328, reaches the ejection region SE and opposes the recording head array 330, and ink droplets from the recording head array 330 are adhered in accordance with image data.

Because the recording paper P is conveyed in the state of being retained at the conveyance belt 328, image formation may be carried out with the recording paper P passing through the ejection region SE. Moreover, by circulating the recording paper P retained at the conveyance belt 328, "multipass" image formation may be carried out by passing the recording paper P through the ejection region SE plural times.

In the second exemplary embodiment, in the recording head array 330, four inkjet recording heads 332, corresponding to each of the four colors Y, M, C and K, are arranged along the conveyance direction of the inkjet recording head 332. The inkjet recording heads 332 have long-strip forms with effective recording regions of at least the width of the recording paper P (a length of the recording paper P in a direction orthogonal to the conveyance direction). Thus, formation of full-color images is made possible. The respective inkjet recording heads 332 have similar structures to the inkjet recording heads 48 described in the first exemplary embodiment and, similarly to the inkjet recording heads 48, include the nozzles 48*a*. Operations of the inkjet recording heads 332 are controlled by the recording head controller 84 described in the first exemplary embodiment.

At the downstream side of the recording head array 330, the camera 50 is disposed to be capable of photographing images formed on the recording paper P by the recording head array 330.

A charging roller 335, which is connected to an unillustrated power supply, is disposed at the upstream side of the recording head array 330. The charging roller 335 is driven while sandwiching the conveyance belt 328 and the recording paper P between the charging roller 335 and the driving roller 324. The charging roller 335 is movable between a pressing position, at which the charging roller 335 presses the recording paper P against the conveyance belt 328, and a withdrawn position, at which the charging roller 335 is withdrawn from the conveyance belt 328. At the pressing position, the charging roller 335 supplies charge to the recording paper P, and the recording paper P is electrostatically attracted to the conveyance belt 328.

Further downstream from the recording head array 330 than the camera 50, a separation plate 340 is disposed. The separation plate 340 is formed of an aluminium plate or the like, and can separate the recording paper P from the conveyance belt 328. The separated recording paper P is conveyed by plural ejection roller pairs 342, which structure an ejection path 344 at the downstream side of the separation plate 340, and is ejected to an ejection tray 346 provided at an upper portion of the casing 314.

A cleaning roller 348 capable of sandwiching the conveyance belt 328 between the cleaning roller 348 and the driven roller 326 is disposed below the separation plate 340. The surface of the conveyance belt 328 is cleaned by the cleaning roller 348.

A reversal path 352 structured by plural reversal roller pairs 350 is provided between the paper supply tray 316 and the conveyance belt 328. Image formation on both sides of the recording paper P may be carried out using the reversal path 352, by a recording paper P to which an image formed on one side being reversed and fed to the conveyance belt 328.

Ink tanks 354, which respectively retain inks of the four colors, are provided between the conveyance belt 328 and the ejection tray 346. The inks in the ink tanks 354 are supplied to the recording head array 330 by ink supply piping (not shown).

Figure 9:
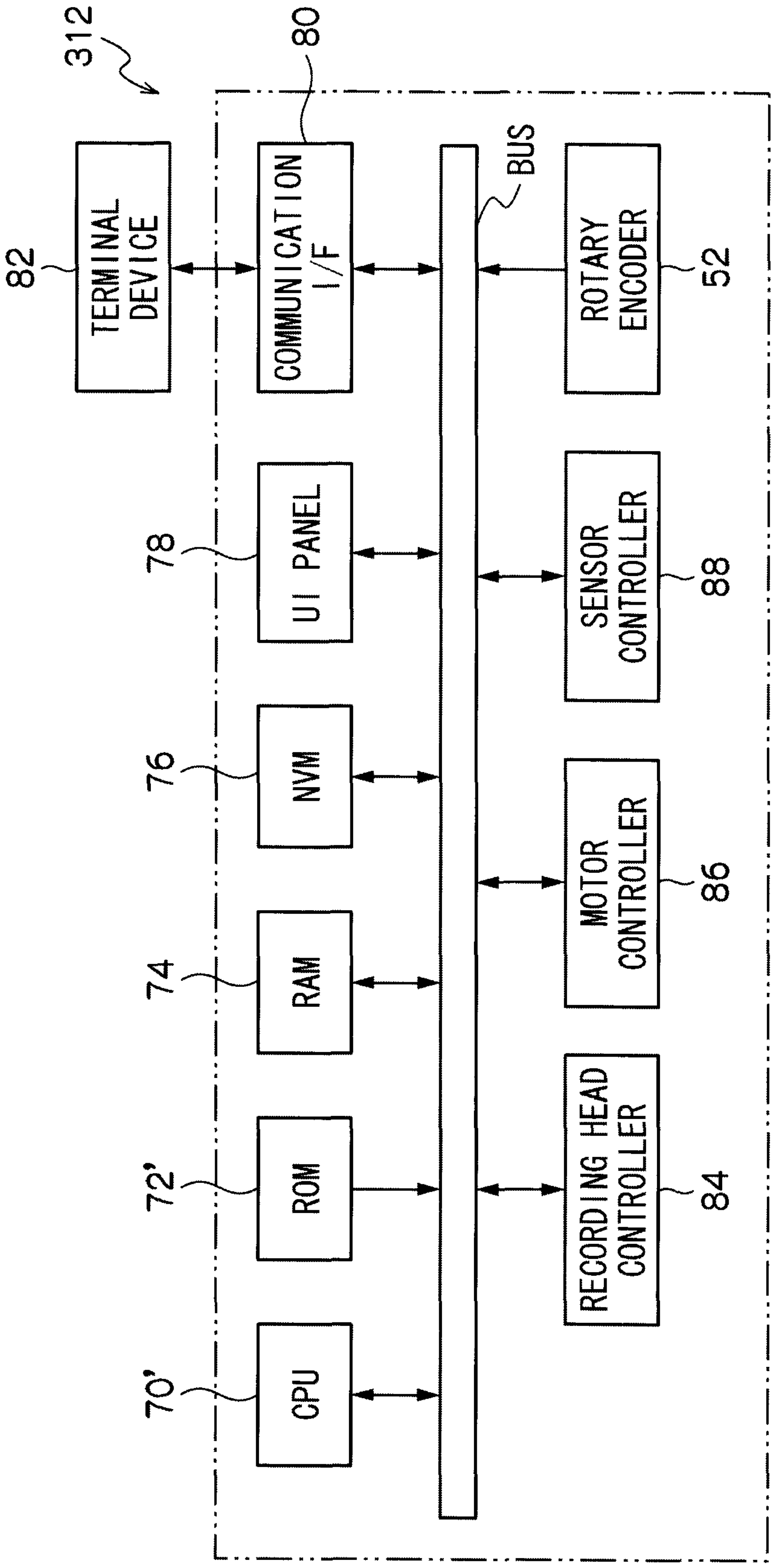
FIG. 9 is a block diagram showing principal structures of an electronic system of the image formation device relating to the second exemplary embodiment.

FIG. 9 is a block diagram showing principal structures of an electronic system of the image formation device 312 relating to the second exemplary embodiment. Herebelow, structural elements that are the same as in FIG. 3 are assigned the same reference numerals and will not be described.

The image formation device 312 differs from the image formation device 10 of the first exemplary embodiment only in employing a CPU 70' instead of the CPU 70 and in employing a ROM 72' instead of the ROM 72. The CPU 70' controls overall operations of the image formation device 312. The ROM 72' functions as a memory section that stores: a control program that controls operations of the image formation device 312; a rotation angle of the driving roller 324 at which the pulse signal is generated by the rotary encoder 52, that is, a rotation angle of the driving roller 324 when one pulse signal for detecting rotation angles of the driving roller 324 from the reference position is generated by the rotary encoder 52 (hereafter referred to as the reference rotation angle $\Theta_0$); an ideal distance between the surface of the conveyance belt 328 over a peripheral surface of the driving roller 324 and the axial center of the driving roller 324 (hereafter referred to as the distance $R_0$); a distance between neighboring dots (herein, between centers of the dots; referred to hereafter as distance $X_0$); a later-described correction table creation program relating to the second exemplary embodiment; and various parameters and the like. For the second exemplary embodiment, an ideal radius of the driving roller 324 is employed as the distance $R_0$.

Next, operation of the image formation device 312 relating to the second exemplary embodiment will be described.

In the image formation device 312 relating to the second exemplary embodiment, recording paper P taken out from the paper supply tray 316 is conveyed to and reaches the conveyance belt 328. The recording paper P is pressed against the conveyance belt 328 by the charging roller 335 and is attracted to and retained at the conveyance belt 328 by voltage applied from the charging roller 335. In this state, the recording paper P passes through the ejection region SE due to cyclic traveling of the conveyance belt, while ink droplets are ejected from the recording head array 330, and an image is formed on the recording paper P.

Now, a conveyance speed of the recording paper P retained at the surface of the conveyance belt 328 varies for reasons such as eccentricity of the driving roller 324, errors from installation of the rotary encoder 52 and the like. In conditions in which the conveyance speed of the recording paper P at the conveyance belt 328 varies in this manner, clock signals synchronized with the pulse signals generated by the rotary encoder 52 are outputted to the inkjet recording heads 332, and the ink droplets are ejected from the nozzles 48*a* in the inkjet recording heads 332 synchronously with these clock signals, an image formed by the ink droplets will deform.

Accordingly, in the image formation device 312 relating to the second exemplary embodiment, in order to suppress deformation of an image caused by eccentricity of the driving roller 324, an installation error of the rotary encoder 52 and suchlike, correction table creation processing is executed.

Figure 10:
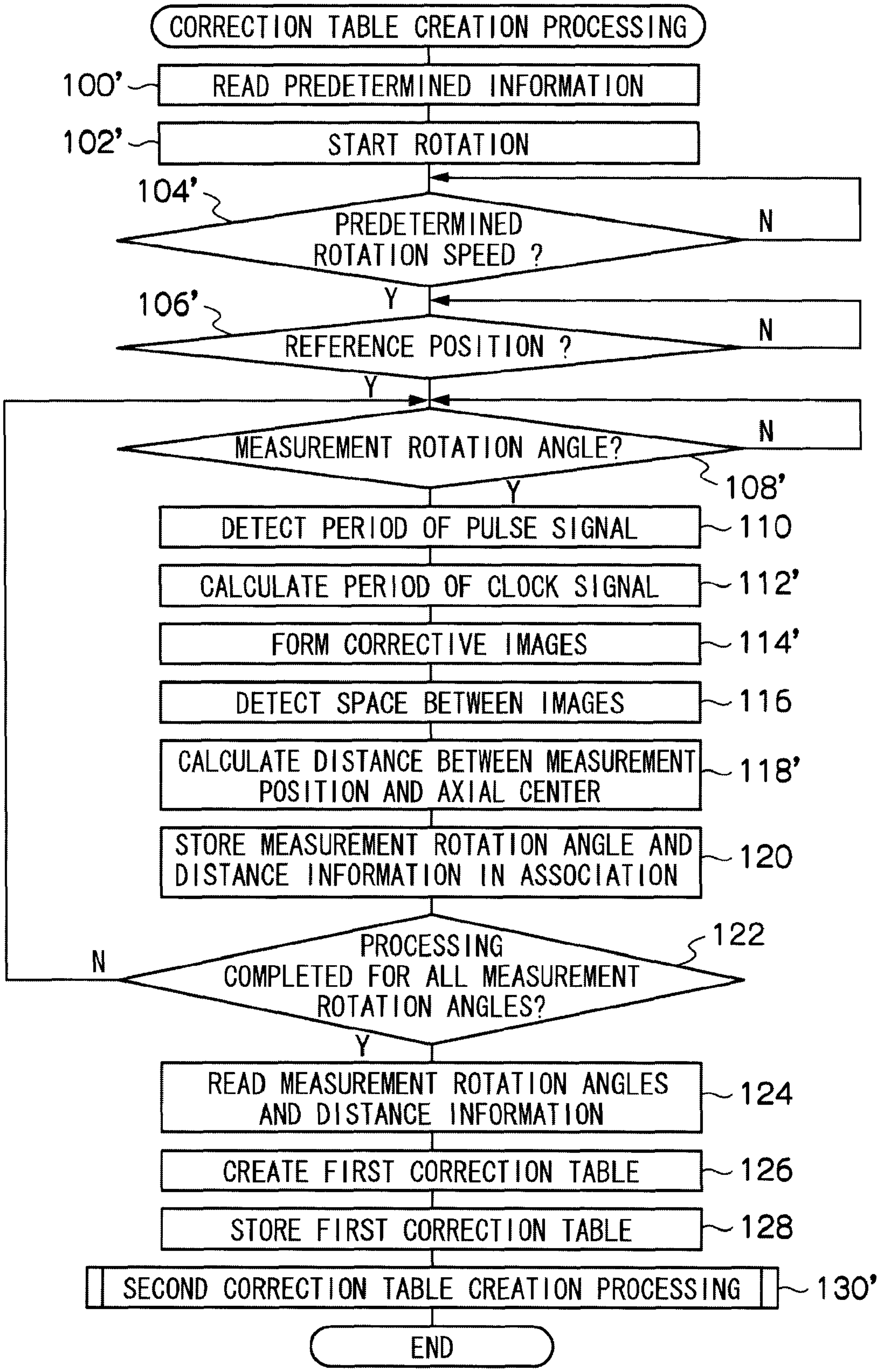
FIG. 10 is a flowchart showing a flow of a correction table creation program relating to the second exemplary embodiment.

Operation of the image formation device 312 when the correction table creation processing is being executed will be described with reference to FIG. 10. FIG. 10 is a flowchart showing a flow of a correction table creation program executed by the CPU 70' of the image formation device 312 when an instruction for execution of the correction table creation processing is inputted via the UI panel 78. The program is stored at a predetermined region of the ROM 72. Here, steps in FIG. 10 that perform the same processing as in the program illustrated in FIG. 5 are assigned the same step numbers as in FIG. 5 and descriptions thereof are omitted.

In step 100' of FIG. 10, the reference rotation angle $\Theta_0$ and the distances $X_0$ and $R_0$ are read out from the ROM 72'. In step 102', the motor 30 is controlled such that the driving roller 324 starts rotary driving. In step 104', the processing waits until the driving roller 324 reaches a predetermined rotation speed (for example, 10 mm/s).

In step 106', the processing waits until the driving roller 324 reaches the reference position. Then, in step 108', the processing waits until a rotation angle of the driving roller 324 from the reference position reaches a pre-specified (measurement) rotation angle in question. Here, there are multiple pre-specified (measurement) rotation angles, which are processed sequentially.

In step 112', a period of the clock signal that determines timings of ejection of ink droplets from the nozzles 48*a* is calculated with equation (1), and the processing advances to step 114'. In equation (1) in the second exemplary embodiment, P represents the period of the clock signal and E represents the period of the pulse signal detected in step 110.

In step 114', corrective images are formed sequentially by nozzle group A and nozzle group B, at different positions on a recording face (predetermined face) of the recording paper P, synchronously with the clock signal with the period calculated in step 112'. The corrective images are used for correcting periods of clock signals from the CPU 70' for ejection of ink droplets from the nozzles 48*a*.

In the image formation device 312 relating to the second exemplary embodiment, line images as same as in the first exemplary embodiment are employed as the corrective images. In the image formation device 312 relating to the second exemplary embodiment, as the processing of step 114', the corrective images are formed sequentially by nozzle group A and nozzle group B on the recording face of the recording paper P synchronously with the clock signal with the period calculated in step 112', such that a distance between the corrective images to be an integer multiple of the distance $X_0$, the integer being at least 1 (3 in this case).

In step 118', an actual distance between a predetermined (measurement) position on the surface of the conveyance belt 328 over the peripheral surface of the driving roller 324 (here, a center point between the corrective images) and the axial center of the driving roller 324 is calculated with equation (2). In the second exemplary embodiment, in equation (2), R represents the distance between the predetermined (measurement) position of the peripheral surface of the surface of the conveyance belt 328 over the peripheral surface of the driving roller 324 and the axial center of the driving roller 324, d represents the space between the corrective images detected in step 116, L represents the space between the nozzle groups A and B, and n represents the integer that is at least 1 (3 in this case).

In step 130', a second correction table creation routine program relating to the second exemplary embodiment, which will be described below, is executed, and then the correction table creation processing program ends.

Figure 11:
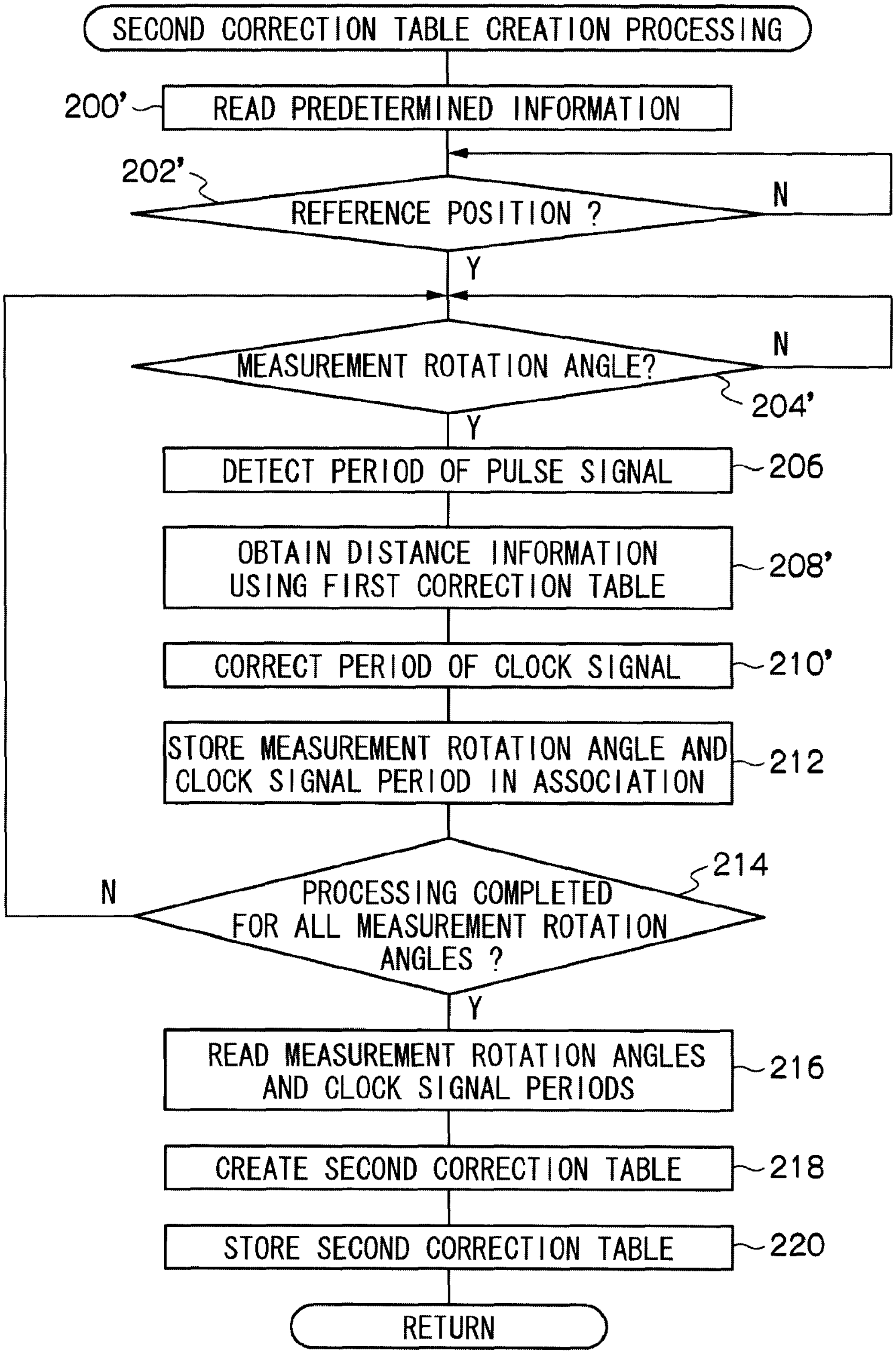
FIG. 11 is a flowchart showing a flow of a second correction table creation routine program relating to the second exemplary embodiment.

Next, the second correction table creation routine program relating to the second exemplary embodiment will be described with reference to FIG. 11. FIG. 11 is a flowchart showing a flow of processing of the second correction table creation routine program. This program too is stored at a predetermined region of the ROM 72'. Here, steps in FIG. 11 that perform the same processing as in the program illustrated in FIG. 7 are assigned the same step numbers as in FIG. 7 and descriptions thereof is omitted.

In step 200' of FIG. 11, the reference rotation angle $\Theta_0$ and the distance $X_0$ are read from the ROM 72'. In step 202', the processing waits until the driving roller 324 reaches the reference position. In step 204', the processing waits until a rotation angle of the driving roller 324 from the reference position reaches a pre-specified (measurement) rotation angle in question.

In step 208', the first correction table stored in the NVM 76 is read out, distance information corresponding to the pre-specified (measurement) rotation angle is obtained with reference to the first correction table, and the processing advances to step 210'.

In step 210', by calculating the period of the clock signal with equation (3), the period of the clock signal is corrected. In equation (3) in the second exemplary embodiment, P represents the period of the clock signal, R represents the distance represented by the distance information obtained in step 208', and E represents the period of the pulse signal detected in step 206.

In the image formation device 312 relating to the second exemplary embodiment, after the correction table creation processing has been executed, when the CPU 70' receives image information, the CPU 70' turns the driving roller 324 at a predetermined rotation speed (a rotation speed determined to be a speed at which excellent images are formed on the recording paper P), and reads the second correction table from the NVM 76. Referring to the second correction table, the CPU 70' generates clock signals with periods corresponding to the pre-specified respective (measurement) rotation angles, and causes ink droplets to be ejected from the nozzles 48*a* in accordance with the image data synchronously with these clock signals. As a result, an image represented by the image information is formed at the recording face of the recording paper P without being affected by changes in conveyance speed of the recording paper P.

Hereabove, the present invention has been described using the exemplary embodiments, but the technical scope of the present invention is not to be limited to the scope described in the exemplary embodiments. Numerous modifications and improvements may be applied to the exemplary embodiments in a scope without departing from the spirit of the present invention, and modes to which modifications and/or improvements are applied are also encompassed by the technical scope of the invention.

Furthermore, the exemplary embodiments are not limiting to the inventions recited in the claims, and not all of the combinations of characteristics described in the above exemplary embodiments are necessarily required as elements of the invention. Inventions with various stages of the exemplary embodiments are to be included, and various inventions may be derived by combinations of the disclosed plural structural elements in accordance with circumstances. Even if some structural element is removed from the totality of structural elements illustrated in the exemplary embodiments, as long as the effects are obtained, a structure from which this some structural element has been removed may be derived to serve as the invention.

For example, in the exemplary embodiments, the inkjet recording heads 48 and 332 have structures in which the nozzles 48*a* are lined up in two rows with respect to the sub-scanning direction. However, the present invention is not limited thus. Structures of the inkjet recording heads 48 and 332 may be any structure in which the plural nozzles 48*a* are arranged in two dimensions such that the nozzles 48*a* are not aligned in the sub-scanning direction (the nozzles 48*a* are disposed offset with respect to the sub-scanning direction).

FIG. 12A to FIG. 12D are schematic views showing structural examples in which the plural nozzles 48*a* of the inkjet recording head 48 or 332 are lined up in six rows without aligning the nozzles 48*a* in the sub-scanning direction.

Figures 12A, 12B, 12C, 12D:
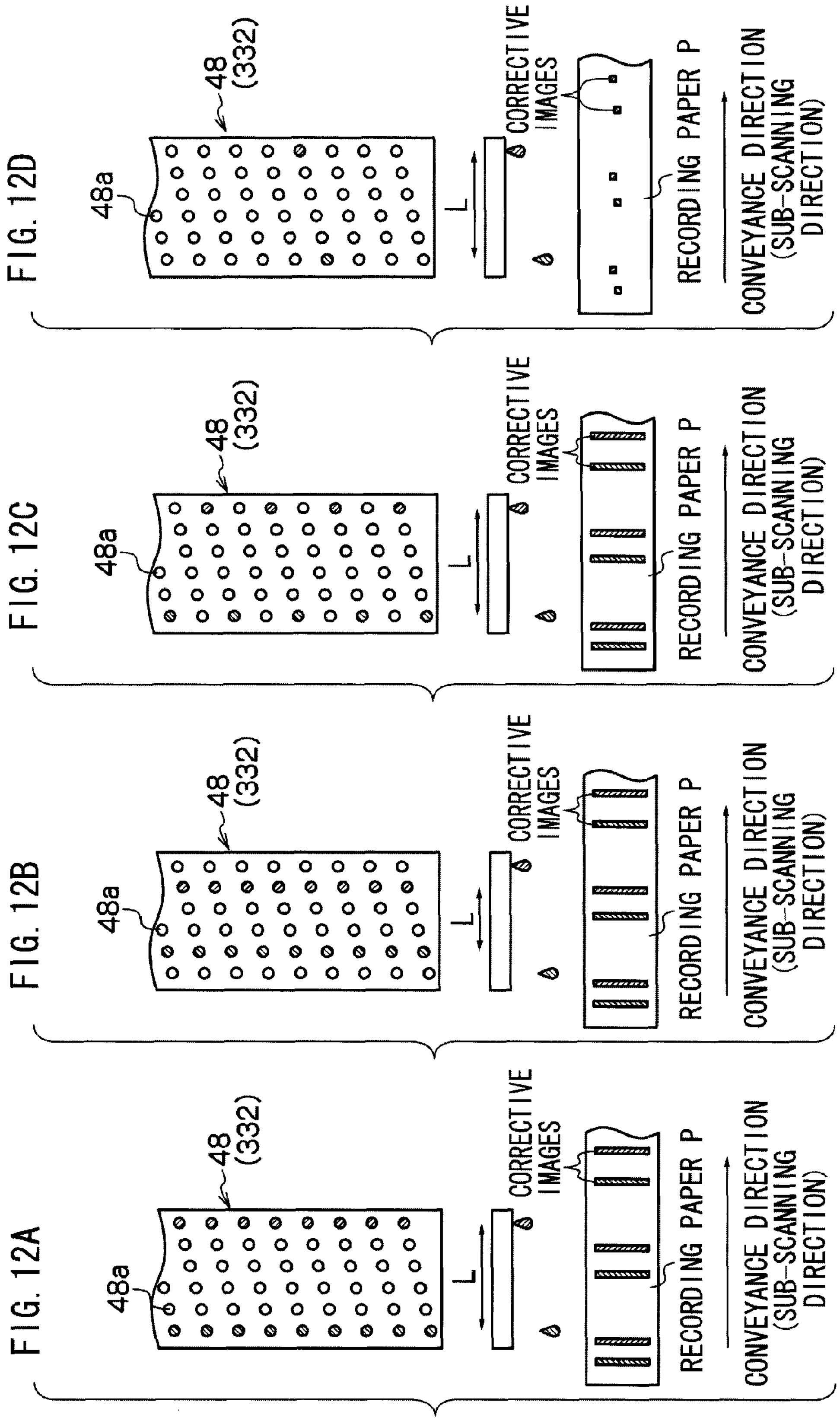
FIG. 12A to FIG. 12D are schematic views showing alternative examples of arrangements of nozzles that eject ink droplets when forming corrective images, and examples of the corrective images in such cases.

When line images are formed at a recording paper P to serve as the corrective images using the inkjet recording head 48 or 332 of FIG. 12A to FIG. 12D, line images may be formed on the paper P using the nozzles 48*a* in any two rows with respect to the sub-scanning direction. For example: as shown in FIG. 12A, line images to be the corrective images may be formed on the recording paper P using the nozzles 48*a* belonging to the two rows that are furthest apart in the sub-scanning direction; as shown in FIG. 12B, line images to be the corrective images may be formed on the recording paper P using the nozzles 48*a* in the second row from the upstream side in the sub-scanning direction and the second row from the downstream side in the sub-scanning direction; or as shown in FIG. 12C, line images to be the corrective images may be formed on the recording paper P using every second nozzle in the main scanning direction of the nozzles 48*a* belonging to the two rows that are apart in the sub-scanning direction.

The exemplary embodiments have been described giving cases in which line images are formed on the recording paper P to serve as the corrective images as examples, but the present invention is not limited thus. As shown in FIG. 12D, dot images may be formed on the recording paper P to serve as the corrective images, using single nozzles 48*a* of the nozzles 48*a* belonging to the two rows that are apart in the sub-scanning direction.

Figure 13:
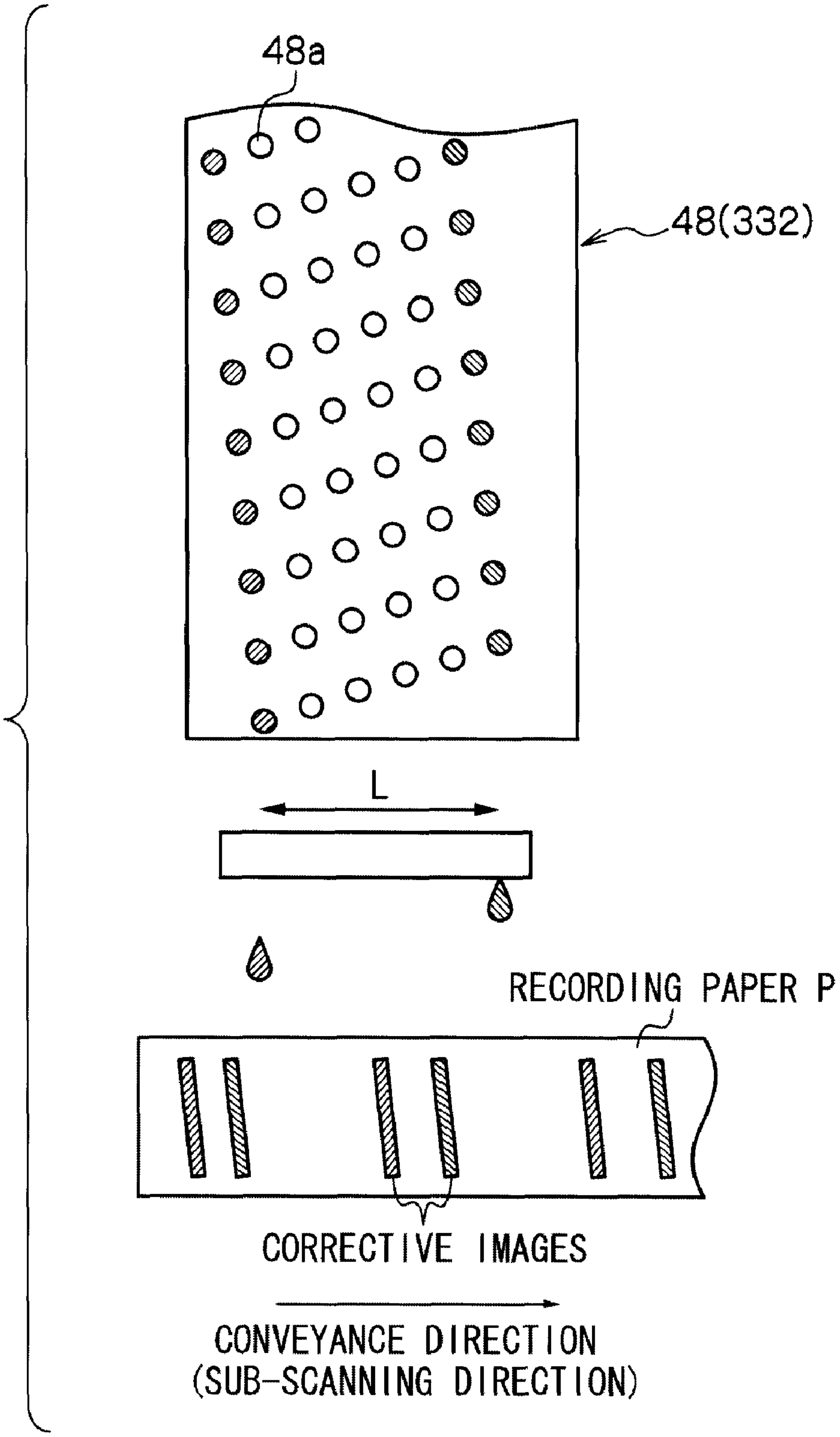
FIG. 13 is schematic views showing another example of an arrangement of nozzles that eject ink droplets when forming corrective images, and an example of the corrective images in such a case.

Further, exemplary embodiments have been described of cases in which line images orthogonal to the sub-scanning direction are formed on the recording paper P by plural nozzles 48*a* to serve as the corrective images, but the present invention is not limited thus. For example, as shown in FIG. 13, plural rows of the nozzles 48*a* may be arranged so as to be inclined relative to the sub-scanning direction, and line images inclined relative to the sub-scanning direction may be formed on the recording paper P by the plural nozzles 48*a* to serve as the corrective images. In a case in which the nozzles 48*a* are arranged in this manner, dots may also be formed to serve as the corrective images.

In the exemplary embodiments, examples have been described in which clock signal periods are calculated using equation (1), but the present invention is not limited thus. A table to which measured pulse signal periods are inputted and which outputs the clock signal periods may be stored in a memory component such as the ROM 72 or 72' or the like, and clock signal periods may be obtained using this table.

In the first exemplary embodiment, an example has been described in which the distance between the pre-specified position of the peripheral surface of the image formation drum 44 and the axial center of the image formation drum 44 is calculated using equation (2), but the present invention is not limited thus. A table to which measured spaces between the corrective images are inputted and which outputs distances between pre-specified positions of the peripheral surface of the image formation drum 44 and the axial center of the image formation drum 44 may be stored in a memory component such as the ROM 72 or the like, and distances between pre-specified positions of the peripheral surface of the image formation drum 44 and the axial center of the image formation drum 44 may be obtained using this table.

In the second exemplary embodiment, an example has been described in which the distance between the pre-specified position of the surface of the conveyance belt 328 over the peripheral surface of the driving roller 324 and the axial center of the driving roller 324 is calculated using equation (2), but the present invention is not limited thus. A table to which measured spaces between corrective images are inputted and which outputs distances between pre-specified positions of the surface of the conveyance belt 328 over the peripheral surface of the driving roller 324 and the axial center of the driving roller 324 may be stored in a memory component such as the ROM 72' or the like, and distances between pre-specified positions of the surface of the conveyance belt 328 over the peripheral surface of the driving roller 324 and the axial center of the driving roller 324 may be obtained using this table.

In the exemplary embodiments, examples have been described in which correction is implemented by calculating clock signal periods using equation (3), but the present invention is not limited thus. A table to which distances represented by calculated distance information and measured pulse signal periods are inputted and which outputs clock signal periods may be stored in a memory component such as the ROM 72 or 72' or the like, and clock signal periods may be corrected using this table.

In the exemplary embodiments, examples have been described in which the image formation device is of a type that directly forms an image on the recording paper P with inkjet recording heads, but the present invention is not limited thus. The device may be an image formation device that forms images on recording paper P via an intermediate transfer body. For example, an image formation device in which a latent image is formed at a peripheral surface (a predetermined face) of a photosensitive drum, which is a rotating body, by recording heads provided with light-emitting devices such as LEDs or the like, the latent image is formed into a toner image, and the toner image is transferred onto a surface of a recording medium may be used.

In the exemplary embodiments, examples have been described in which the second image correction table is created and the clock signals during image formation are generated with reference to the second correction table, but the present invention is not limited thus. Clock signal periods may be corrected each time image formation is performed using the first correction table and the image formation may be performed with the corrected clock signals that are obtained.

In the first exemplary embodiment, an example has been described in which the image formation device 10 is provided with the ink drying section 18 and the image fixing section 20, but the present invention is not limited thus. The device may be provided with either of an apparatus that dries corrective images and an apparatus that fixes corrective images. In a case of an image formation device provided with an apparatus that dries corrective images, spaces between the corrective images are measured before drying processing of the corrective images is performed, and in a case of an image formation device provided with an apparatus that fixes corrective images, spaces between the corrective images are measured before fixing processing of the corrective images is performed.

In the second exemplary embodiment, an embodiment example has been described of a case in which drying processing of corrective images or fixing processing of corrective images is not carried out, but the present invention is not limited thus. Drying processing or fixing processing may be carried out as in the first exemplary embodiment, and in such a case, the spaces between the corrective images may be measured before these processing are performed.

The structures of the image formation devices 10 and 312 described in the exemplary embodiments (shown in FIG. 1 to FIG. 3, FIG. 8 and FIG. 9) are examples, and may be modified in accordance with circumstances within a scope without departing from the spirit of the present invention.

The mathematical equations described in the above exemplary embodiments are also examples; unnecessary parameters may be removed and new parameters may be added.

The flows of processing of the various processing programs described in the exemplary embodiments (shown in FIG. 5, FIG. 7, FIG. 10 and FIG. 11) are also examples and, within a scope without departing from the spirit of the present invention, unnecessary steps may be removed, new steps may be added, and processing sequences may be rearranged.

What is claimed is:

1. A correction information creation device comprising:

a recording head in which a plurality of image formation elements are two-dimensionally arranged such that the image formation elements are not aligned in a sub-scanning direction, the image formation elements respectively forming dots that constitute an image at a predetermined surface synchronously with a clock signal;

a rotating body that rotates with a peripheral surface thereof opposing the image formation elements, the rotating body functioning as one of a transfer body that transfers an image formed at the peripheral surface by the image formation elements to a surface of a recording medium or a conveyance body that conveys the recording medium, in a state in which the recording medium is retained at the peripheral surface, such that the surface of the recording medium opposes the image formation elements;

a pulse generator that generates a pulse signal in accordance with rotation of the rotating body;

a first detector that detects a period of the pulse signal;

a first calculation section that calculates a period of the clock signal on the basis of a reference rotation angle of the rotating body at which the pulse signal is generated, a distance between neighboring dots, an ideal distance between the peripheral surface of the rotating body and an axial center of the rotating body, and the detected period of the pulse signal;

a formation section that, while the rotating body is being rotated at a predetermined rotation speed, causes at least two sets of image formation elements of the plurality of image formation elements to sequentially form corrective images, which are used for correcting the period of the clock signal, at different positions of the peripheral surface, synchronously with a clock signal occurring at the period calculated by the first calculation section, wherein the at least two sets of image formation elements comprises a first set of image formation elements disposed at upstream side in a rotation direction of the rotating body, and a second set of image formation elements disposed at downstream side in the rotation direction, the at least two sets of image formation elements are separated from each other by a predetermined space in the rotation direction;

a second detector that detects a space between the formed corrective images;

a second calculation section that calculates a distance between a measurement position of the peripheral surface of the rotating body and the axial center of the rotating body on the basis of the detected space between the corrective images, a value obtained by multiplying the distance between the dots by a predetermined integer, the predetermined space, and the ideal distance between the peripheral surface of the rotating body and the axial center of the rotating body; and a memory section that stores distance information representing the distance calculated by the second calculation section, to serve as information for correcting the period of the clock signal, in association with a measurement rotation angle from a reference position of the rotating body to the measurement position.

2. The correction information creation device according to claim 1 wherein, the first calculation section calculates the period P of the clock signal with the following equation (1):

$$P = \frac{X_0}{\Theta_0 R_0} E \quad (1)$$

where $X_0$ represents the distance between the dots, $\Theta_0$ represents the reference rotation angle, $R_0$ represents the ideal distance between the peripheral surface of the rotating body and the axial center of the rotating body, and E represents the detected period of the pulse signal.

3. The correction information creation device according to claim 1 wherein, the second calculation section calculates the distance R between the measurement position of the peripheral surface of the rotating body and the axial center of the rotating body with the following equation (2):

$$R = \frac{L - d}{L - nX_0} R_0 \quad (2)$$

where d represents the detected space between the corrective images, n represents the predetermined integer, $X_0$ represents the distance between the dots, L represents the predetermined space, and $R_0$ represents the ideal distance between the peripheral surface of the rotating body and the axial center of the rotating body.

4. The correction information creation device according to claim 1, wherein the corrective images are at least one of line images or dots.

5. An image formation device comprising:

the correction information creation device according to claim 1;

a reading section that reads, from the memory section, the distance information corresponding to the measurement rotation angle; and a correction section that corrects the period of the clock signal on the basis of the reference rotation angle, the distance between the dots, the distance represented by the read distance information, and the period of the pulse signal detected by the first detector at the measurement rotation angle.

6. The image formation device according to claim 5 wherein, the correction section corrects the period P of the clock signal by calculating the period P with the following equation (3):

$$P = \frac{X_0}{\Theta_0 R} E \quad (3)$$

where $X_0$ represents the distance between the dots, $\Theta_0$ represents the reference rotation angle, R represents the distance represented by the distance information read by the reading section, and E represents the period of the pulse signal detected by the first detector at the measurement rotation angle.

7. The image formation device according to claim 5, further comprising a processing apparatus that executes at least one of drying processing that dries the corrective images or fixing processing that fixes the corrective images, wherein the second detector detects the space between the corrective images before processing is executed by the processing apparatus.

8. A non-transitory computer readable storage medium storing a program causing a computer to execute a process for correcting a period of a clock signal of an image formation apparatus, the image formation apparatus comprises: a recording head in which a plurality of image formation elements are two-dimensionally arranged such that the image formation elements are not aligned in a sub-scanning direction, the image formation elements respectively forming dots that constitute an image at a predetermined surface synchronously with the clock signal; and a rotating body that rotates with a peripheral surface thereof opposing the image formation elements, the rotating body functioning as one of a transfer body that transfers an image formed at the peripheral surface by the image formation elements to a surface of a recording medium or a conveyance body that conveys the recording medium, in a state in which the recording medium is retained at the peripheral surface, such that the surface of the recording medium opposes the image formation elements, the process comprising:

detecting a period of a pulse signal generated in accordance with rotation of the rotating body;

calculating a period of the clock signal on the basis of a reference rotation angle of the rotating body at which the pulse signal is generated, a distance between neighboring dots, an ideal distance between the peripheral surface of the rotating body and an axial center of the rotating body, and the detected period of the pulse signal;

while the rotating body being rotated at a predetermined rotation speed, causing at least two sets of image formation elements of the plurality of image formation elements to sequentially form corrective images, which are used for correcting the period of the clock signal, at different positions of the peripheral surface, synchronously with a clock signal with the calculated period, wherein the at least two sets of image formation elements comprises a first set of image formation elements disposed at upstream side in a rotation direction of the rotating body, and a second set of image formation elements disposed at downstream side in the rotation direction, the at least two sets of image formation elements are separated from each other by a predetermined space in the rotation direction;

detecting a space between the formed corrective images;

calculating a distance between a measurement position of the peripheral surface of the rotating body and the axial center of the rotating body on the basis of the detected space between the corrective images, a value obtained by multiplying the distance between the dots by a predetermined integer, the predetermined space, and the ideal distance between the peripheral surface of the rotating body and the axial center of the rotating body; and storing distance information representing the calculated distance, to serve as information for correcting the period of the clock signal, in association with a measurement rotation angle from a reference position of the rotating body to the measurement position.

9. The non-transitory storage medium according to claim 8 wherein, calculating the period of the clock signal comprises calculating the period P of the clock signal with the following equation (1):

$$P = \frac{X_0}{\Theta_0 R_0} E \quad (1)$$

where $X_0$ represents the distance between the dots, $\Theta_0$ represents the reference rotation angle, $R_0$ represents the ideal distance between the peripheral surface of the rotating body and the axial center of the rotating body, and E represents the detected period of the pulse signal.

10. The non-transitory storage medium according to claim 8 wherein, calculating the distance between the measurement position of the peripheral surface of the rotating body and the axial center of the rotating body includes calculating the distance R between the measurement position of the peripheral surface of the rotating body and the axial center of the rotating body with the following equation (2):

$$R = \frac{L - d}{L - nX_0} R_0 \qquad (2)$$

where d represents the detected space between the corrective images, n represents the predetermined integer, $X_0$ represents the distance between the dots, L represents the predetermined space, and $R_0$ represents the ideal distance between the peripheral surface of the rotating body and the axial center of the rotating body.

11. The non-transitory storage medium according to claim 8, wherein the corrective images are at least one of line images and dots.

12. The non-transitory storage medium according to claim 8, wherein the processing further comprises:

reading the stored distance information corresponding with the measurement rotation angle; and correcting the period of the clock signal on the basis of the reference rotation angle, the distance between the dots, the distance represented by the read distance information, and the period of the pulse signal detected at the measurement rotation angle.

13. The non-transitory storage medium according to claim 12 wherein, the correcting includes correcting the period P of the clock signal, by calculating the period P with the following equation (3):

$$P = \frac{X_0}{\Theta_0 R} E \qquad (3)$$

where $X_0$ represents the distance between the dots, $\Theta_0$ represents the reference rotation angle, R represents the distance represented by the read distance information, and E represents the period of the pulse signal detected at the measurement rotation angle.

14. The non-transitory storage medium according to claim 12, wherein the image formation apparatus further includes a processing apparatus that executes at least one of drying processing that dries the corrective images or fixing processing that fixes the corrective images, and detecting the space between the corrective images is executed before processing is executed by the processing apparatus.

15. A method of correcting a period of a clock signal of an image formation apparatus, the image formation apparatus comprising: a recording head at which a plurality of image formation elements are two-dimensionally arranged such that the image formation elements are not aligned in a sub-scanning direction, the image formation elements respectively forming dots that constitute an image at a predetermined surface synchronously with the clock signal; and a rotating body that rotates with a peripheral surface thereof opposing the image formation elements, the rotating body functioning as one of a transfer body that transfers an image formed at the peripheral surface by the image formation elements to a surface of a recording medium or a conveyance body that conveys the recording medium, in a state in which the recording medium is retained at the peripheral surface, such that the surface of the recording medium opposes the image formation elements, the method comprising:

detecting a period of a pulse signal generated in accordance with rotation of the rotating body;

calculating a period of the clock signal on the basis of a reference rotation angle of the rotating body at which the pulse signal is generated, a distance between neighboring dots, a distance ideal between the peripheral surface of the rotating body and an axial center of the rotating body, and the detected period of the pulse signal;

while the rotating body being rotated at a predetermined rotation speed, causing at least two sets of image formation elements of the plurality of image formation elements to sequentially form corrective images, which are used for correcting the period of the clock signal, at different positions of the peripheral surface, synchronously with a clock signal occurring at the calculated period, wherein the at least two sets of image formation elements comprises a first set of image formation elements disposed at upstream side in a rotation direction of the rotating body, and a second set of image formation elements disposed at downstream side in the rotation direction, the at least two sets of image formation elements are separated from each other by a predetermined space in the rotation direction;

detecting a space between the formed corrective images;

calculating a distance between a measurement position of the peripheral surface of the rotating body and the axial center of the rotating body on the basis of the detected space between the corrective images, a value obtained by multiplying the distance between the dots by a predetermined integer, the predetermined space, and the ideal distance between the peripheral surface of the rotating body and the axial center of the rotating body; and storing distance information representing the calculated distance, to serve as information for correcting the period of the clock signal, in association with a measurement rotation angle from a reference position of the rotating body to the measurement position.

* * * * *